US011366475B2

(12) United States Patent
Hasejima et al.

(10) Patent No.: US 11,366,475 B2
(45) Date of Patent: Jun. 21, 2022

(54) PARKING SUPPORT APPARATUS

(71) Applicant: Clarion Co., Ltd., Saitama (JP)

(72) Inventors: Noriyasu Hasejima, Tokyo (JP); Makoto Ishinoda, Saitama (JP); Shinya Tagawa, Saitama (JP); Takehito Ogata, Tokyo (JP)

(73) Assignee: CLARION CO., LTD., Saitama (JP)

( * ) Notice: Subject to any disclaimer, the term of this patent is extended or adjusted under 35 U.S.C. 154(b) by 86 days.

(21) Appl. No.: 16/651,819

(22) PCT Filed: Sep. 10, 2018

(86) PCT No.: PCT/JP2018/033413
§ 371 (c)(1),
(2) Date: Mar. 27, 2020

(87) PCT Pub. No.: WO2019/065180
PCT Pub. Date: Apr. 4, 2019

(65) Prior Publication Data
US 2020/0249679 A1 Aug. 6, 2020

(30) Foreign Application Priority Data

Sep. 29, 2017 (JP) .............................. JP2017-192228

(51) Int. Cl.
*B60W 30/06* (2006.01)
*B62D 15/02* (2006.01)
(Continued)

(52) U.S. Cl.
CPC ....... *G05D 1/0212* (2013.01); *G01C 21/3407* (2013.01); *G05D 2201/0213* (2013.01)

(58) Field of Classification Search
CPC ............. B62D 15/0285; B62D 15/027; B62D 15/028; B62D 15/029; B60W 30/06;
(Continued)

(56) References Cited

U.S. PATENT DOCUMENTS

2010/0286875 A1* 11/2010 Inoue .................. B62D 15/027
701/49
2012/0191337 A1 7/2012 Schoenherr et al.
(Continued)

FOREIGN PATENT DOCUMENTS

DE 102009046677 A1 5/2011
EP 2620351 A2 * 7/2013 ......... B62D 15/0285
(Continued)

OTHER PUBLICATIONS

Japanese Office Action dated Apr. 27, 2021 regarding Japanese Patent Application No. 2017-192228 corresponding to U.S. Appl. No. 16/651,819 (3 pages) with English Translation (3 pages).
(Continued)

*Primary Examiner* — Abby Y Lin
*Assistant Examiner* — Hossam M Abd El Latif
(74) *Attorney, Agent, or Firm* — Lewis Roca Rothgerber Christie LLP

(57) ABSTRACT

A parking support apparatus sets a plurality of candidate connection positions along a reverse direction route, calculates a first connection route, calculates a first parking route by using the first connection route and the reverse direction route, judges whether the candidate connection position exists within a recognition range or not; and if the candidate connection position does not exist within the recognition range, calculates a shortest steering wheel turning position, calculates a second connection route capable of reaching any one of the candidate connection positions calculates a second parking route by using the second connection route and the reverse direction route, when the second parking route can be calculated, the second parking route is selected as the parking route; otherwise, the first parking route is selected as the parking route.

2 Claims, 21 Drawing Sheets

(51) Int. Cl.
*G01C 21/34* (2006.01)
*G05D 1/02* (2020.01)
*G08G 1/16* (2006.01)

(58) Field of Classification Search
CPC ....... B60W 2554/00; B60W 2554/801; B60W 2556/45; B60W 2900/00; B60W 30/0953; B60W 50/14; G01C 21/3407; G05D 1/0212; G05D 2201/0213; G08G 1/168; G08G 1/167; G08G 1/149; G06K 9/00805; G06K 9/00892; G06K 19/06028; G06K 19/06037
USPC .......................................................... 701/25
See application file for complete search history.

(56) References Cited

U.S. PATENT DOCUMENTS

| | | | | |
|---|---|---|---|---|
| 2016/0144784 | A1* | 5/2016 | Kwon | G01S 15/08 340/435 |
| 2019/0027042 | A1* | 1/2019 | Fujishima | B60W 30/06 |

FOREIGN PATENT DOCUMENTS

| | | |
|---|---|---|
| EP | 3 369 627 | 9/2018 |
| JP | 2006-347460 A | 12/2006 |
| JP | 2010-208392 | 9/2010 |
| JP | 2011207383 A * | 10/2011 |
| JP | 2015-003615 | 1/2015 |
| JP | 2017-019435 | 1/2017 |
| JP | 2017-81398 | 5/2017 |
| JP | 2017081398 A | 5/2017 |

OTHER PUBLICATIONS

International Search Report with Written Opinion, corresponding to PCT/JP2018/033413, dated Nov. 20, 2018, 7 pages.
Extended European Search Report dated Jan. 25, 2021 for European counterpart Application No. 18862700.4 (7 pages).
Japanese Office Action dated Aug. 3, 2021 regarding Japanese Patent Application No. 2017-192228 corresponding to U.S. Appl. No. 16/651,819 (4 pages) with English Translation (4 pages).
Chinese Office Action dated Oct. 20, 2021 regarding Chinese Patent Application No. 201880063030.3 corresponding to U.S. Appl. No. 16/651,819 (7 pages) with English Translation (6 pages).

* cited by examiner

FIG. 2
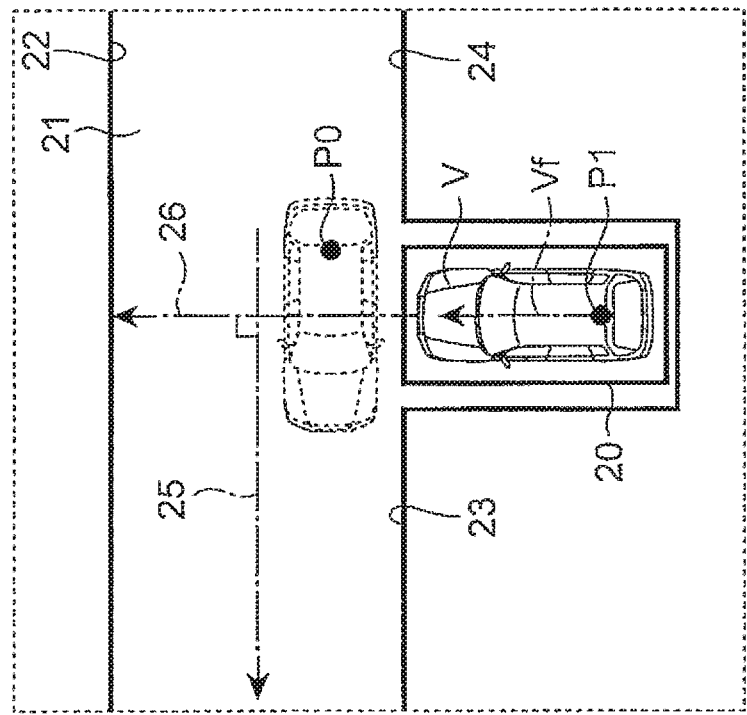
(BEFORE PARKING)
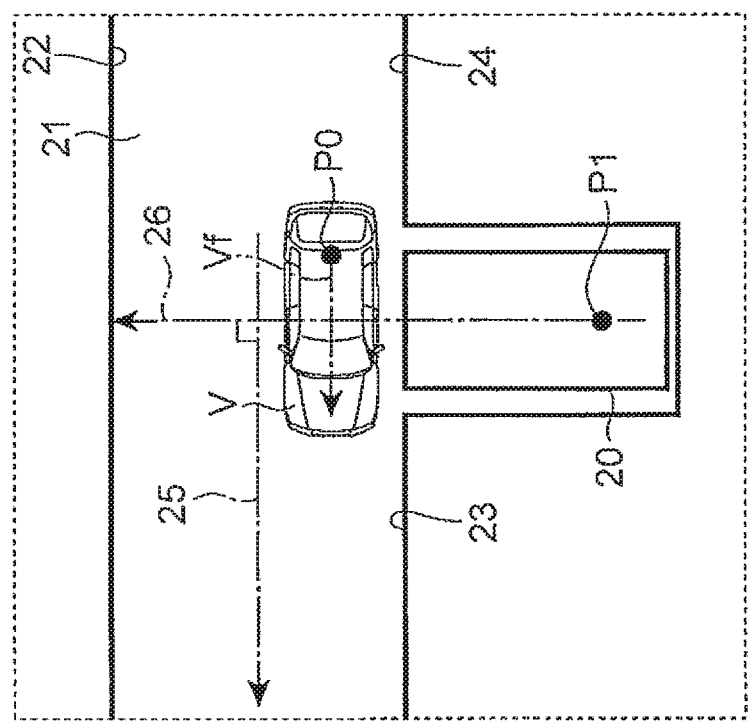
(AFTER PARKING)

$m(X_m, Y_m) = ((X_e + R\sin\theta)/2, (Y_e - R\cos\theta + R)/2)$

PARKING SUPPORT APPARATUS

CROSS-REFERENCE TO RELATED APPLICATION(S)

This application is a U.S. National Phase Patent Application and claims priority to and the benefit of International Application Number PCT/JP2018/033413, filed on Sep. 10, 2018, which claims priority of Japanese Patent Application Number 2017-192228, filed on Sep. 29, 2017, the entire contents of all of which are incorporated herein by reference.

TECHNICAL FIELD

The present invention relates to a parking support apparatus for a vehicle.

BACKGROUND ART

PTL 1 describes technology of a parking support apparatus for calculating a guiding route including turning of the steering wheel for parking a vehicle and providing support so that the vehicle can reach a target position along the guiding route.

CITATION LIST

Patent Literature

PTL 1: Japanese Patent Application Laid-Open (Kokai) Publication No. 2010-208392

SUMMARY OF THE INVENTION

Problems to be Solved by the Invention

However, with the calculated guiding route, there is a possibility that the steering wheel may be turned at a position far from a target parking completion position; or as the target parking completion position may be out of a recognition range of an external recognition sensor, problems may occur such that many forward/reverse steering changes are required depending on the positions of surrounding obstacles and it takes time to complete parking the vehicle. So, the above-described technology may sometimes not be suited for the circumstances or the needs.

The present invention was devised in light of the above-described circumstances and it is an object of the invention to provide a parking support apparatus capable of calculating a parking route within the recognition range of the external recognition sensor and also capable of calculating the parking route suited for the circumstances and the needs to perform parking operation near the target parking completion position.

Means to Solve the Problems

A parking support apparatus according to the present invention to solve the above-described problems is a parking support apparatus for supporting parking operation to perform backward parallel parking of a driver's own vehicle at a target parking position provided along a lateral side of a passage, wherein the parking support apparatus includes: a reverse direction route calculation unit that calculates a reverse direction route for the driver's own vehicle to leave from the target parking position on the basis of a parking space and a behavior constraint condition for the driver's own vehicle; a candidate connection position setting unit that sets a plurality of candidate connection positions along the reverse direction route; a first parking route calculation unit that calculates a first connection route capable of reaching any one of the plurality of candidate connection positions from an initial position of the driver's own vehicle and calculates a first parking route by using the first connection route and the reverse direction route; a recognition range judgment unit that judges whether or not the candidate connection position included in the first connection route exists within a preset recognition range from the initial position of the driver's own vehicle: a shortest steering wheel turning position calculation unit that calculates a shortest steering wheel turning position which is obtained by turning a vehicle direction of the driver's own vehicle to a direction to make the vehicle direction of the driver's own vehicle closer to a direction to park in the parking space by moving the driver's own vehicle from the initial position with a forward/reverse steering change when it is judged by the recognition range judgment unit that the candidate connection position included in the first connection route does not exist within the recognition range; a second parking route calculation unit that calculates a second connection route capable of reaching any one of the plurality of candidate connection positions from the shortest steering wheel turning position and calculates a second parking route by using the second connection route and the reverse direction route; and a traveling route setting unit that selects: the second parking route as a parking route when the second parking route calculation unit can calculate the second parking route; and the first parking route as the parking route when the second parking route calculation unit cannot calculate the second parking route.

Advantageous Effects of the Invention

The parking route suited for the circumstances and the needs can be calculated according to the present invention. Further features relating to the present invention will become apparent from the explanation of this description and the attached drawings. Furthermore, problems, configurations, and advantageous effects other than those described above will become apparent from the explanation of embodiments below.

BRIEF DESCRIPTION OF DRAWINGS

FIG. 2 is a diagram illustrating the state before and after parking by backward parallel parking;

DESCRIPTION OF EMBODIMENTS

Next, an embodiment of the present invention will be explained with reference to the drawings.

Figure 1:
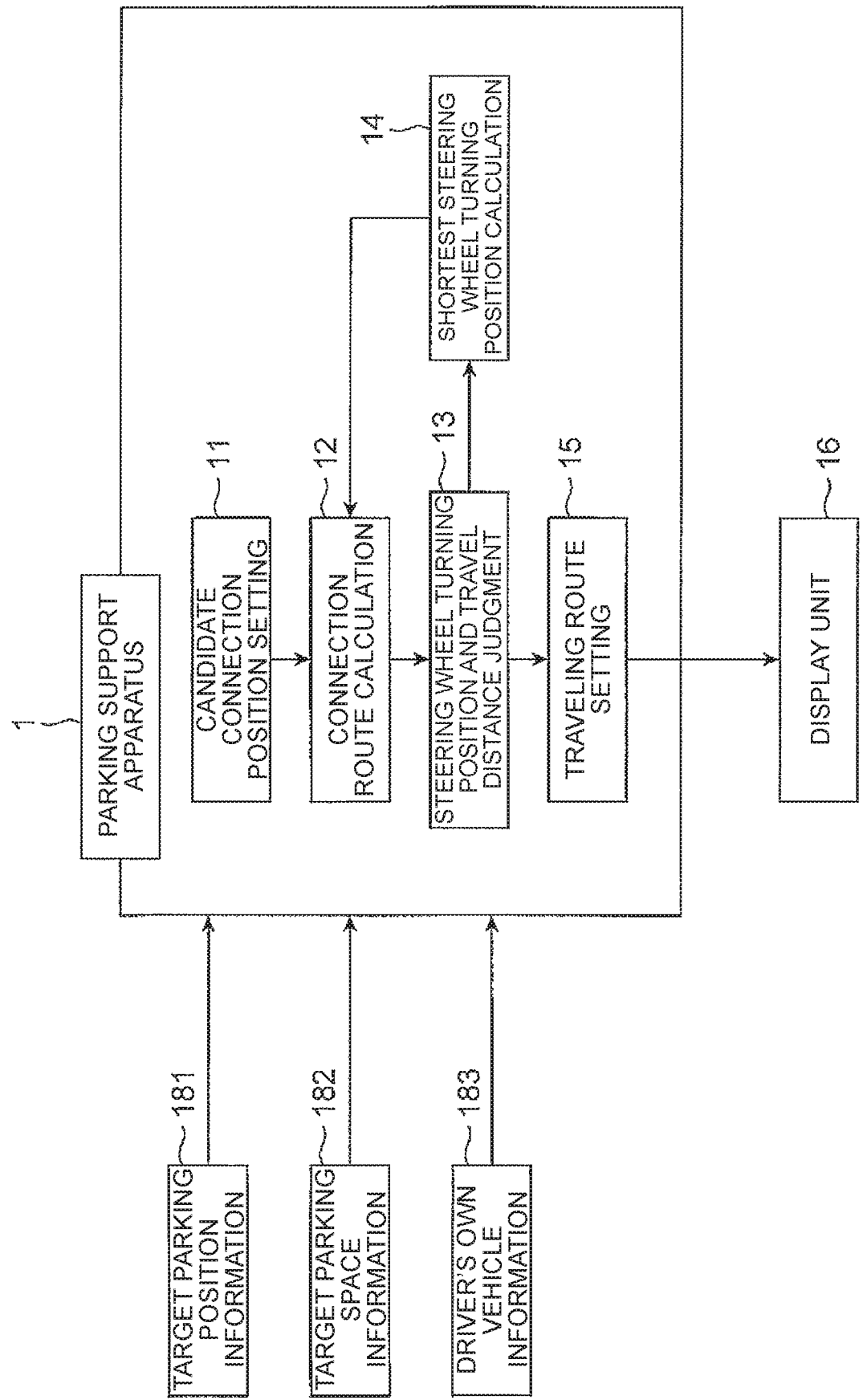
FIG. 1 is a functional block diagram of a parking support apparatus according to an embodiment of the present invention.

FIG. 1 is a functional block diagram of a parking support apparatus according to an embodiment of the present invention: and FIG. 2 is a diagram illustrating the state before and after parking by backward parallel parking.

A parking support apparatus 1 is an apparatus for supporting parking of a driver's own vehicle V in a parking space 20 and, particularly, is an apparatus for supporting parking of the driver's own vehicle V in the parking space 20 provided in a parking direction 26 at a right angle with a passage direction 25 of a passage 21, that is, parallel parking. The parking space 20 is a marked-off area where the parking direction is set in advance to park a vehicle in a specified direction; and it is also called a parking frame, a park section, a parking area, a parking place, or a parking lot.

In the example illustrated in FIG. 2, the parking space 20 is provided on the left side of the passage direction 25 which is a direction of the passage 21 and the parking direction 26 is set to park the driver's own vehicle V backwards.

Referring to FIG. 2, the parking support apparatus 1: calculates a route to guide the driver's own vehicle V from a state where a vehicle direction Vf of the driver's own vehicle V is placed in the same direction as the passage direction 25 at an initial position P0 in the passage 21, so that the vehicle direction Vf will be placed in the same direction as the parking direction 26 at a target parking position P1 in the parking space 20; and sets the calculated route as a parking route.

In a parking environment where the driver's own vehicle V is parked, as illustrated in FIG. 2, obstacles 23, 24 such as other vehicles and other parking spaces are located ahead of and behind the parking space 20 in the passage 21 and an obstacle 22 such as a wall, curbstones, or other vehicles is located along the passage direction 25 of the passage 21 on the other lateral side of the passage 21 opposite the parking space 20 side. Incidentally, this embodiment is set so that the obstacles 23, 24 always exist on both sides of the parking space 20.

Figure 17:
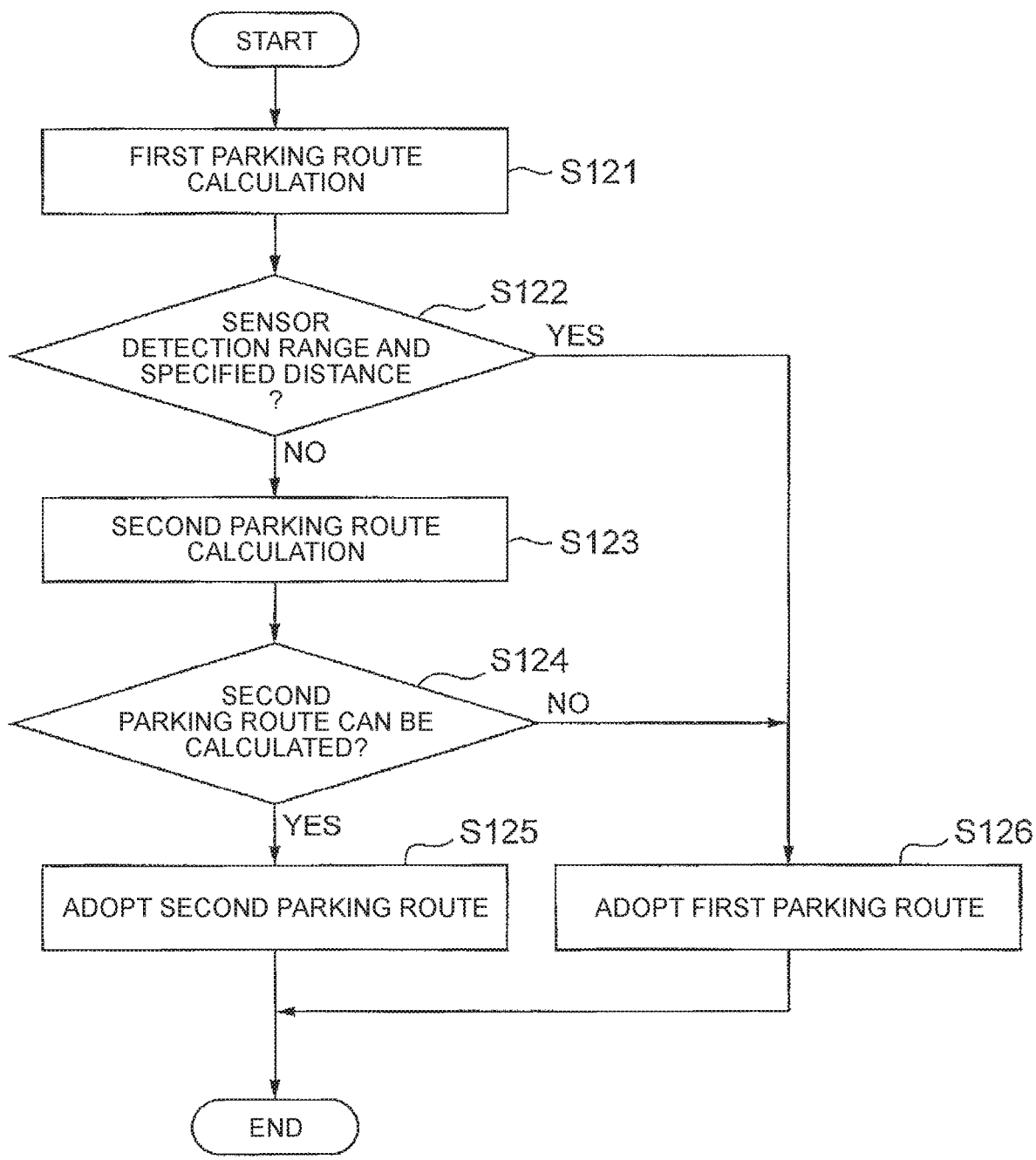
FIG. 17 is a flowchart for explaining a parking route selection method.

The parking support apparatus 1 calculates the parking route for guiding the driver's own vehicle V to the parking space 20. As the driver's own vehicle V moves along the calculated parking route, it can be parked in the parking space 20 beside the passage. When calculating a first parking route, the parking support apparatus 1 checks whether or not the first parking route satisfies threshold conditions such as a travel distance and a steering wheel turning position; and if the first parking route satisfies the threshold conditions, the parking support apparatus 1 adopts the first parking route. On the other hand, if the first parking route does not satisfy the threshold conditions, the parking support apparatus 1 calculates a second parking route including a steering wheel turning operation at a shortest steering wheel turning position; and if the second parking route can be calculated, the parking support apparatus 1 adopts the second parking route; and if the second parking route cannot be calculated, the parking support apparatus 1 adopts the first parking route. Therefore, it is possible to park the vehicle with the parking route suited for the circumstances and the needs. FIG. 17 is a flowchart illustrating a parking support method by the parking support apparatus 1.

Regarding movements of the driver's own vehicle V, for example, the system may be designed so that: the parking route may be displayed on an in-vehicle monitor and the driver may operate the driver's own vehicle V while watching the display; or information of the parking route may be output from the parking support apparatus 1 and the driver's own vehicle V may be parked at the target parking position P1 automatically or semi-automatically. In a case of the semi-automatic parking, for example, steering wheel operations may be performed by automatic control and accelerator operations and brake operations may be performed by the driver. Then, in a case of the automatic parking, all the steering wheel operations, the accelerator operations, and the brake operations are performed by automatic control.

The parking support apparatus 1 is mounted in the driver's own vehicle V and is implemented by cooperation between hardware such as a microcomputer and software programs. The parking support apparatus 1 includes, as illustrated in FIG. 1, a candidate connection position setting unit 11, a connection route calculation unit 12, a steering wheel turning position and travel distance judgment unit 13, a shortest steering wheel turning position calculation unit 14, and a traveling route setting unit 15.

The candidate connection position setting unit 11 calculates at least one or more parking-space leaving routes for the driver's own vehicle V to leave the parking space 20 on the basis of the information of the target parking space and a behavior constraint condition for the driver's own vehicle and sets a plurality of candidate connection positions along the parking-space leaving route.

The connection route calculation unit 12 calculates: the first connection route which starts with a forward movement of the driver's own vehicle V and is capable of reaching at least one of a plurality of candidate connection positions from the initial position P0 of the driver's own vehicle V; and the second connection route which reaches the shortest steering wheel turning position by the forward movement and reverse movement with turning from the initial position P0 of the driver's own vehicle V and then is capable of reaching at least one of a plurality of candidate connection positions via the shortest steering wheel turning position.

The steering wheel turning position and travel distance judgment unit 13 judges a relative positional relationship between coordinates of the candidate connection position, which can be reached from the initial position P0 through the first connection route as determined by the connection route calculation unit 12, and the driver's own vehicle V and also judges whether a travel distance of the calculated first connection route is equal to or less than a threshold value or not. For example, whether the position of the driver's own vehicle V at the candidate connection position is out of a detection range of the external recognition sensor at the initial position P0 of the driver's own vehicle V or not and whether the travel distance from the initial position P0 of the driver's own vehicle V to the candidate connection position is equal to or more than a specified distance or not are judged.

When it is judged by the steering wheel turning position and travel distance judgment unit 13 that the travel distance exceeds a threshold value, the shortest steering wheel turning position calculation unit 14 calculates the shortest steering wheel turning position which can be reached with the shortest distance by means of the forward movement and the reverse movement with turning from the initial position P0 of the driver's own vehicle V by turning the steering wheel once. The shortest steering wheel turning position is the position obtained by moving the driver's own vehicle from the initial position with the forward/reverse steering change and turning the driver's own vehicle to make the vehicle direction Vf closer to the parking direction 26. The connection route calculation unit 12 performs connection route calculation with respect to the plurality of the set candidate connection positions from the shortest steering wheel turning position calculated by the shortest steering wheel turning position calculation unit 14; and if the connection can be made, that connection route is set as the second connection route.

The traveling route setting unit 15 calculates the first parking route by connecting the parking-space leaving route and the first connection route. Also, if the second connection route can be calculated, the traveling route setting unit 15 calculates the second parking route by connecting the parking-space leaving route and the second connection route. However, even if the steering wheel turning position and travel distance judgment unit 13 judges that the travel distance exceeds the threshold value, and if the candidate connection position cannot be reached from the shortest steering wheel turning position, the second connection route cannot be calculated; and the traveling route setting unit 15 sets the first parking route by using the first connection route.

Target parking position information 181 and target parking space information 182 are input to the parking support apparatus 1 as illustrated in FIG. 1. The target parking position information 181 includes information such as the shape of the parking space 20 and a relative position with the driver's own vehicle V. The target parking space information 182 includes information regarding constraint conditions for the parking space such as the positions and distances of obstacles around the parking space 20. The target parking position information 181 and the target parking space information 182 can be acquired from an external recognition sensor mounted in the driver's own vehicle V, for example, a detection signal of an ultrasonic sensor mounted in the driver's own vehicle V and images from an in-vehicle camera. Also, infrastructure information which is output from parking equipment may be acquired.

The drivers own vehicle information 183 includes a behavior constraint condition(s) for the driver's own vehicle such as a turning radius of the driver's own vehicle V. Then, dead reckoning which is calculated with a vehicle model from a steering angle, speeds, and wheel rotation quantity of the driver's own vehicle V may be used as the driver's own vehicle position information 184; and positional information acquired from sensors such as a GPS, and the driver's own vehicle position information obtained by road-to-vehicle communication and inter-vehicle communication may be used as the driver's own vehicle position information 184.

The display unit 16 is an in-vehicle monitor which the driver can watch inside the vehicle and which can display a steering wheel turning position(s) for a target parking route by superimposing it over a video from the camera. Furthermore, not only the steering wheel turning position(s), but also the entire parking route may be displayed. The driver can check their position by watching the steering wheel turning position(s) and the parking route which are displayed on the in-vehicle monitor.

Next, the respective configurations of the candidate connection position setting unit 11, the connection route calculation unit 12, the steering wheel turning position and travel distance judgment unit 13, and the shortest steering wheel turning position calculation unit 14 included in the parking support apparatus 1 will be explained in detail.

<Candidate Connection Position Calculation Unit>

The candidate connection position calculation unit 11 calculates the parking-space leaving route based on the target parking position information 181, the target parking space information 182, and the driver's own vehicle information 183 and also calculates the candidate connection positions when calculating the parking-space leaving route.

The parking-space leaving route is a virtual moving route which is an estimated route for the driver's own vehicle V to leave the parking space 20 from the state where the driver's own vehicle V is accurately located in the parking space 20. The parking-space leaving route is calculated regardless of, and without being restrained by, the initial position P0 of the driver's own vehicle V. The parking-space leaving route calculation unit 11 does not use the driver's own vehicle position information 184 when calculating the parking-space leaving route. The parking-space leaving route is not limited to one route and at least one or more parking-space leaving routes are calculated.

The parking-space leaving route is calculated based on information of the target parking space and the behavior constraint condition for the driver's own vehicle. As a parking-space leaving route from backward parallel parking where the attitude of the driver's own vehicle V at the target parking position P1 is a backward-facing attitude, a route is generated by assuming that the driver's own vehicle V will leave the parking space in the same direction as the direction of the driver's own vehicle V at the initial position P0 when the target parking position P1 is set as an origin.

Regarding the calculation of the parking-space leaving route, the following routes are calculated: a route from the target parking position P1 until a reference point Vo which is an intermediate position between the right and left wheels of the driver's own vehicle V (hereinafter referred to as the position Vo of the driver's own vehicle) exits the parking space 20 by moving the driver's own vehicle V straight forwards from the target parking position P1; a forward movement route for leaving the parking space in the same direction as that of the driver's own vehicle V at the initial position P0 and turning the steering wheel to turn with the forward movement until the driver's own vehicle V reaches a reachable limit position relative to an obstacle located ahead; and a reverse movement route for turning the front wheels back to their straight positions relative to the driver's own vehicle V and then moving the driver's own vehicle V by the reverse movement until it reaches a reachable limit position relative to an obstacle located behind. Then, the forward movement route and the reverse movement route are calculated alternately until specified ending conditions are satisfied.

Incidentally, the reachable limit position means a position separated from the relevant obstacle by a specified clearance. The specified clearance includes a margin in consideration of a specified error to avoid any contact with the obstacle; and the specified clearance should preferably be as small as possible and is set, for example, as approximately 1 cm to 5 cm. In this embodiment, a virtual frame with the specified clearance is set around the outer surface of the driver's own vehicle V and a position where the virtual frame enters into contact with the obstacle is determined as the reachable limit position.

The candidate connection position calculation unit 11 calculates the parking-space leaving route until, for example, at least one of the following specified ending conditions is satisfied: a first condition in which the vehicle direction Vf of the driver's own vehicle V in the parking-space leaving route becomes 90° [deg] with the parking direction 26 and becomes in parallel with, and the same direction as, the passage direction 25; a second condition in which the driver's own vehicle V reaches a point which is separated from the target parking position P1 by a specified distance Hmax in the passage direction 25; and a third condition in which the number of times the steering wheel is turned in the parking-space leaving route reaches a specified number of times.

Figure 3:
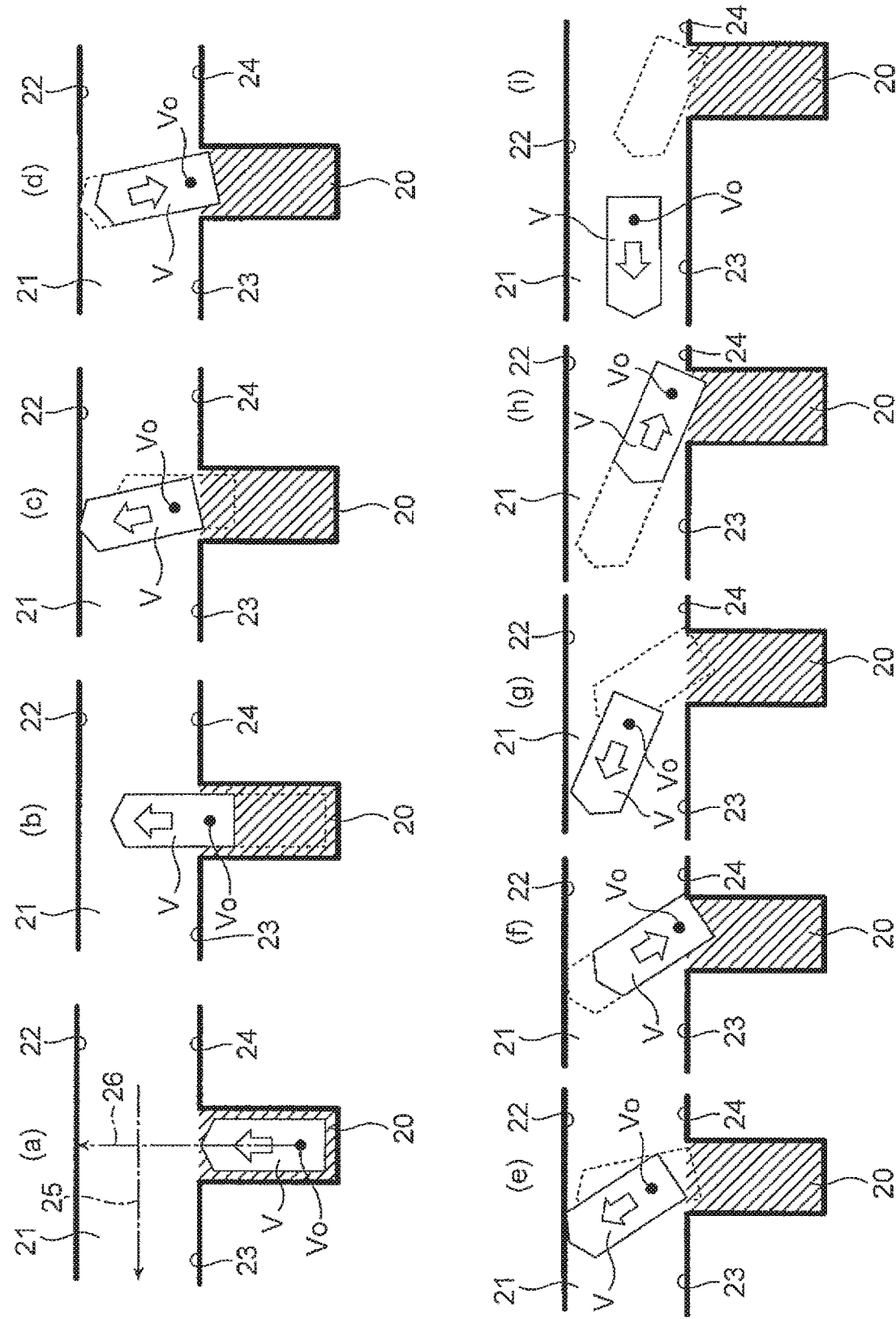
FIG. 3 is a diagram illustrating an example of a method for calculating a parking-space leaving route by the backward parallel parking.

FIG. 3 is a diagram illustrating an example of a method for calculating the parking-space leaving route of the driver's own vehicle according to preset conditions and is a diagram illustrating a case of the backward parallel parking.

For example, in the case of the backward parallel parking illustrated in FIG. 3, the parking-space leaving route is designed so that: (a) the driver's own vehicle V is made to move straight forwards from the state of being parked in the parking space 20; (b) the position Vo of the driver's own vehicle V reaches the exit of the parking space 20; (c) then the steering wheel is turned to the left with the forward movement until the driver's own vehicle V reaches the reachable limit position relative to the obstacle 22 located ahead; and (d) the front wheels are turned back to their straight positions along the vehicle direction of the driver's own vehicle V at the above-described position and then the driver's own vehicle V reaches, with the reverse movement, the reachable limit position relative to the obstacle 24 located behind. Then, the following routes are calculated: (e) a forward movement route for turning the steering wheel to the left; (f) a reverse movement route for the straight reverse movement; (g) a forward movement route for turning the steering wheel to the left; (h) a reverse movement route for the straight reverse movement; and then (i) a route to make the vehicle direction Vf of the driver's own vehicle V become 90° [deg] with the parking direction 26 of the parking space 20 and become in parallel with, and the same direction as, the passage direction 25.

Incidentally, the method for calculating the parking-space leaving route is not limited only to the above-described method and the parking-space leaving route may be calculated according to other conditions. Furthermore, the parking-space leaving route may be calculated by selecting a condition(s) suited for the target parking space from among a plurality of preset conditions.

The candidate connection position setting unit 11 sets a plurality of candidate connection positions while calculating the parking-space leaving route. The candidate connection positions are candidate positions for judging whether the initial position P0 or the shortest steering wheel turning position calculated by the shortest steering wheel turning position calculation 14 can be connected with the reachable route or not. As one of methods for setting the candidate connection position, for example, a plurality of candidate connection lines PL are set in the passage 21 with a specified distance between them in the passage direction of the passage 21, positions in the parking-space leaving route where the position Vo of the driver's own vehicle V interests with these candidate connection lines PL are set as candidate connection positions A, and the candidate connection positions A are linked with the vehicle direction Vf of the driver's own vehicle V at such positions and stored.

Figure 4:
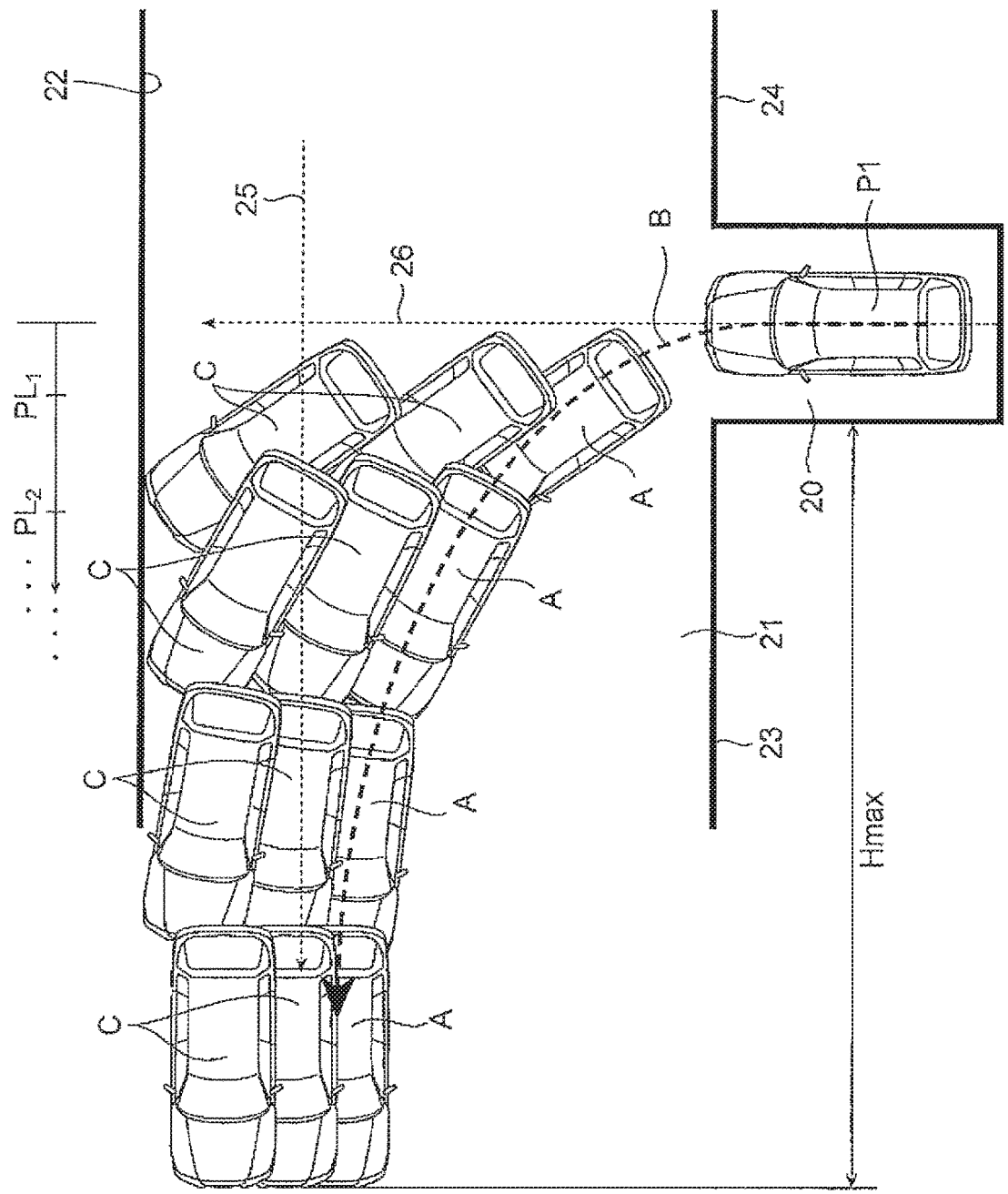
FIG. 4 is a diagram illustrating candidate connection positions for the parking-space leaving route in a case of the backward parallel parking.

FIG. 4 is a diagram illustrating the candidate connection positions in the parking-space leaving route in the case of the backward parallel parking. The reference numeral A in the drawing represents an example of a candidate connection position in the parking-space leaving route for the vehicle leaving the parking space at the position of the target parking position P1; the reference numeral B represents an example of the parking-space leaving route for the vehicle leaving the parking space from the target parking position P1; the reference numeral C represents a candidate connection position calculated based on the reference numeral A; and the reference numeral P1 represents the target parking position.

The candidate connection lines PLn (n is a number) are set so that they extend ahead of the target parking position P1 in the passage direction of the passage 21 and over a widthwise direction of the passage 21 and are set with a specified distance between them in the passage 21 towards the left side of the parking space 20. In this embodiment, the candidate connection lines PLn are set with reference to the target parking position P1 so that a relative angle of each candidate connection line with the target parking position becomes 10 degrees.

Under this circumstance, the reference numeral A is a candidate connection position calculated based on one parking-space leaving route B; however, in light of the driver's behaviors, many cases are observed where the driver operates the vehicle to move closer to the obstacle 22 on the passage side. So, this embodiment is designed so that a position closer to the obstacle 22 on the passage side is also set as a candidate connection position C on the basis of the candidate connection position A.

Figure 5:
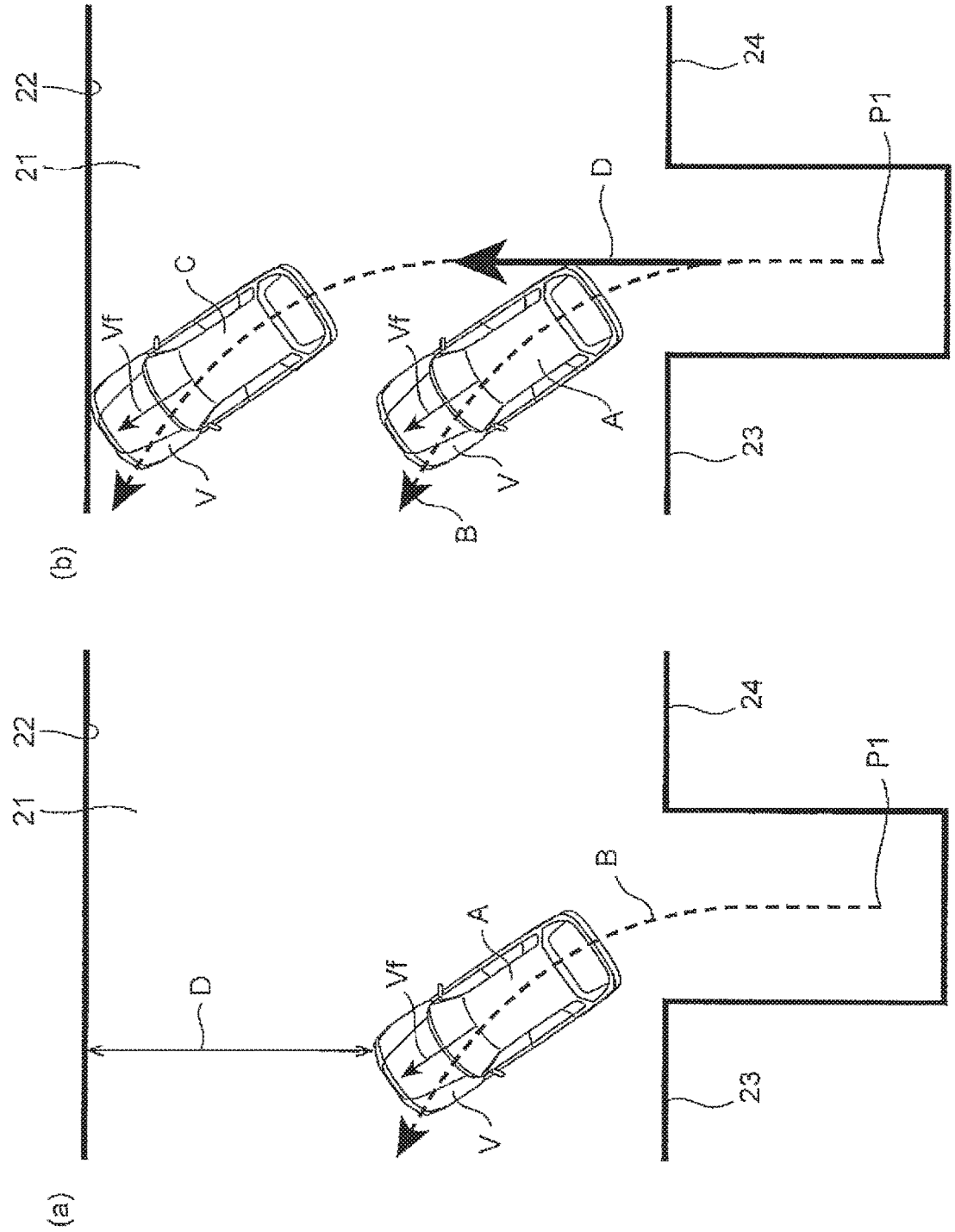
FIG. 5 is a diagram for calculating candidate connection positions at a parking-space leaving route position.

FIG. 5 is a diagram illustrating a method for increasing the candidate connection positions. The reference numeral A in the drawing represents an example of a candidate connection position in a traveling route for leaving the parking space from the position P1; the reference numeral B represents an example of the traveling route for leaving the parking space from P1; the reference numeral C represents a candidate connection position calculated based on the reference numeral A; the reference numeral P1 represents the target parking position; and the reference numeral D represents an example of a straight travel distance to be added.

In this embodiment, the candidate connection position C is added to a position closer to the obstacle 22 on the passage side by adding the straight travel distance D from the target parking position P1. Specifically speaking, as illustrated in FIG. 5(a), the distance D between a corner of the driver's own vehicle V, which is closest to the obstacle 22 on the passage side, at the specified candidate connection position A and the obstacle 22 on the passage side is calculated and the calculated distance D is added to the straight travel distance from the target parking position P1 as illustrated in FIG. 5(b), thereby setting the candidate connection position C closer to the obstacle 22 on the passage side. Under this circumstance, the direction of the driver's own vehicle V at the newly set candidate connection position C becomes the same angle Vf as that of the direction Vf of the driver's own vehicle V at the candidate connection position A, which was used as a reference, in the parking-space leaving route B.

In this embodiment, as illustrated in FIG. 4, candidate connection positions C are calculated respectively for a pattern to which the distance D which is the maximum straight travel amount is added, and a pattern to which a half of the distance D/2 is added. However, the straight travel distance to be added may be any value as long as it is equal to or less than the maximum straight travel amount to reach the obstacle on the passage side.

Figure 6:
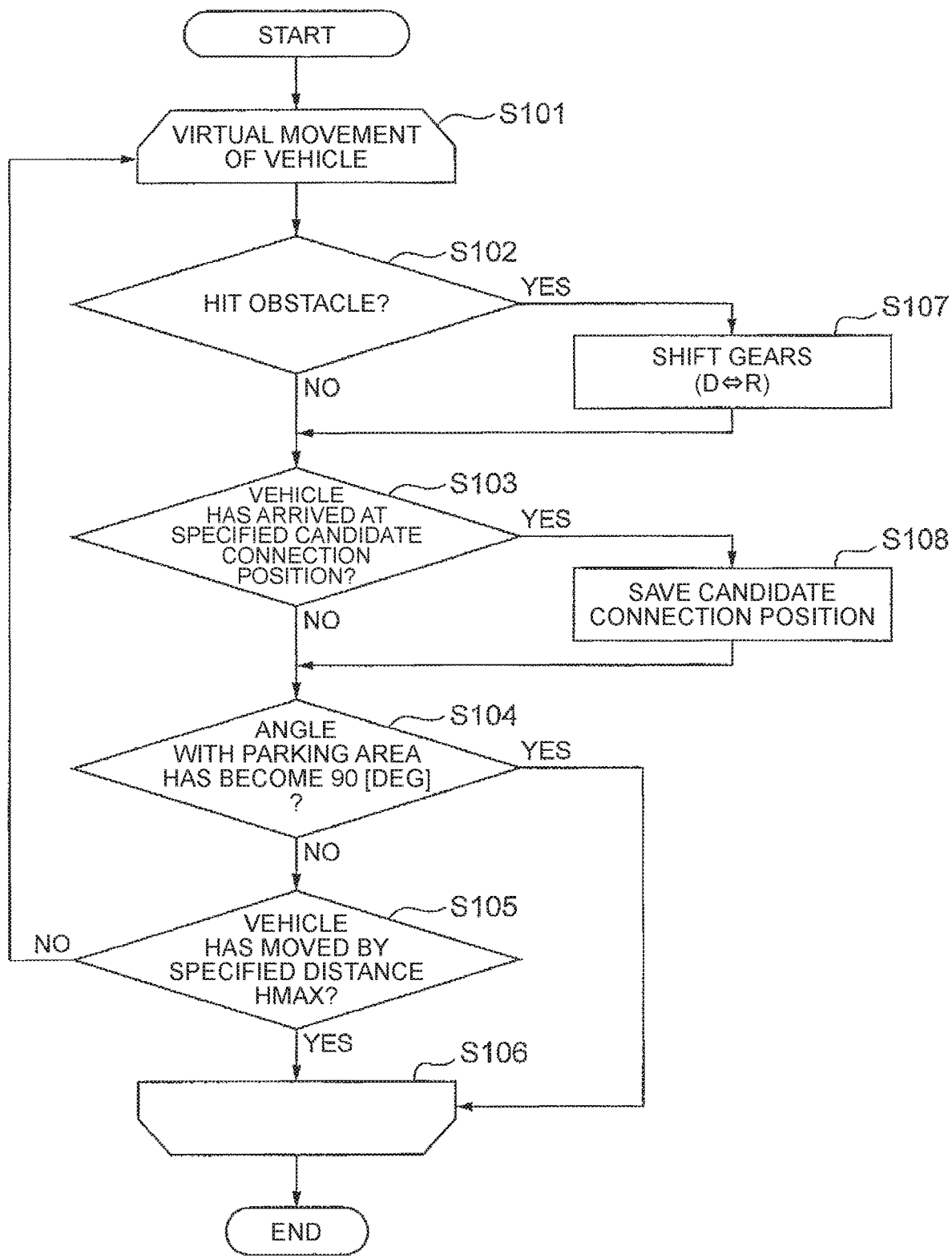
FIG. 6 is a flowchart for explaining a method for calculating the candidate connection position in the parking-space leaving route.

FIG. 6 is a flowchart for explaining the method for calculating the candidate connection position(s) in the parking-space leaving route.

Firstly, the calculation is performed to virtually move the driver's own vehicle V in a direction to leave the parking space from the target parking position P1 in accordance with specified rules (S101); and whether the virtual frame of the driver's own vehicle V will hit the obstacle or not is judged (S102). Then, if it is judged that the virtual frame of the driver's own vehicle V will hit the obstacle, it is determined that the relevant position is a reachable limit position: and a selector lever for the driver's own vehicle V is switched from a D range to an R range or from the R range to the D range to switch the traveling direction of the driver's own vehicle V from the forward movement to the reverse movement or from the reverse movement to the forward movement (S107).

Then, whether the driver's own vehicle V has reached a specified candidate connection position A or not is judged (S103); and when the position Vo of the driver's own vehicle V passes through a candidate connection line PL, that position is set as the candidate connection position A and is stored together with information of the vehicle direction Vf of the driver's own vehicle V at that position (S108). Then, the first condition, that is, whether or not the angle of the driver's own vehicle V has become 90° [deg] with the parking direction 26 and the vehicle direction Vf has entered a state of being in parallel with the passage direction 25 is judged (S104); and if the angle of the driver's own vehicle V has become 90° [deg] with the parking direction 26 and the vehicle direction Vf has entered the state of being in parallel with, and the same direction as, the passage direction 25, it is judged that the first condition is satisfied, and this routine is terminated.

On the other hand, if the vehicle direction Vf of the driver's own vehicle V has not become 90° [deg] with the parking direction 26, whether the driver's own vehicle V has moved away by a specified distance Hmax or not is judged (S105). In this embodiment, the specified distance Hmax is set as 7 meters. If the driver's own vehicle V has moved by the specified distance Hmax or more, it is judged that the second condition is satisfied, and this routine is terminated.

As another method for setting the candidate connection position(s), for example, when the driver's own vehicle V is moved in the parking-space leaving direction along the parking-space leaving route, the candidate connection position setting unit 12 may set the relevant position as a candidate connection position every time the vehicle direction Vf of the driver's own vehicle V changes by a designated relative angle (for example, every 5° [deg]). Consequently, the positions Vo of the driver's own vehicle V where the vehicle direction Vf of the driver's own vehicle V becomes 5°, 10°, 15°, and so on to 90° relative to the parking direction 26 are set as the candidate connection positions A.

<Connection Route Calculation Unit>

The connection route calculation unit 12 calculates a reachable route capable of reaching at least one of the plurality of candidate connection positions A or the candidate connection positions C from the initial position P0 of the driver's own vehicle V or from the shortest steering wheel turning position G calculated by the shortest steering wheel turning position calculation 14.

Whether it is reachable or not is judged on the basis of the position Vo of the driver's own vehicle V and the vehicle direction Vf; and if the position Vo of the driver's own vehicle V matches the candidate connection position A or the candidate connection position C and the vehicle direction Vf of the driver's own vehicle V matches the vehicle direction Vf which is stored by being linked to the candidate connection position A or the candidate connection position C by the calculation of the parking-space leaving route calculation unit 11, it is judged that the relevant route is reachable.

If the driver's own vehicle V is moved from the initial position P0 and can be located in a specified vehicle direction Vf at any one of the candidate connection positions A or the candidate connection positions C, then the driver's own vehicle V can be moved into the parking space 20 by tracking the parking-space leaving route B in an opposite direction. Therefore, the connection route calculation unit 13 sets a candidate connection position A or C where the driver's own vehicle V can be located in the specified vehicle direction Vf from the initial position P0, as an out-of-parking-space position E from among the plurality of candidate connection positions A or C in the parking-space leaving route B, and calculates a connection route from the initial position P0 to the out-of-parking-space position E.

Figure 7:
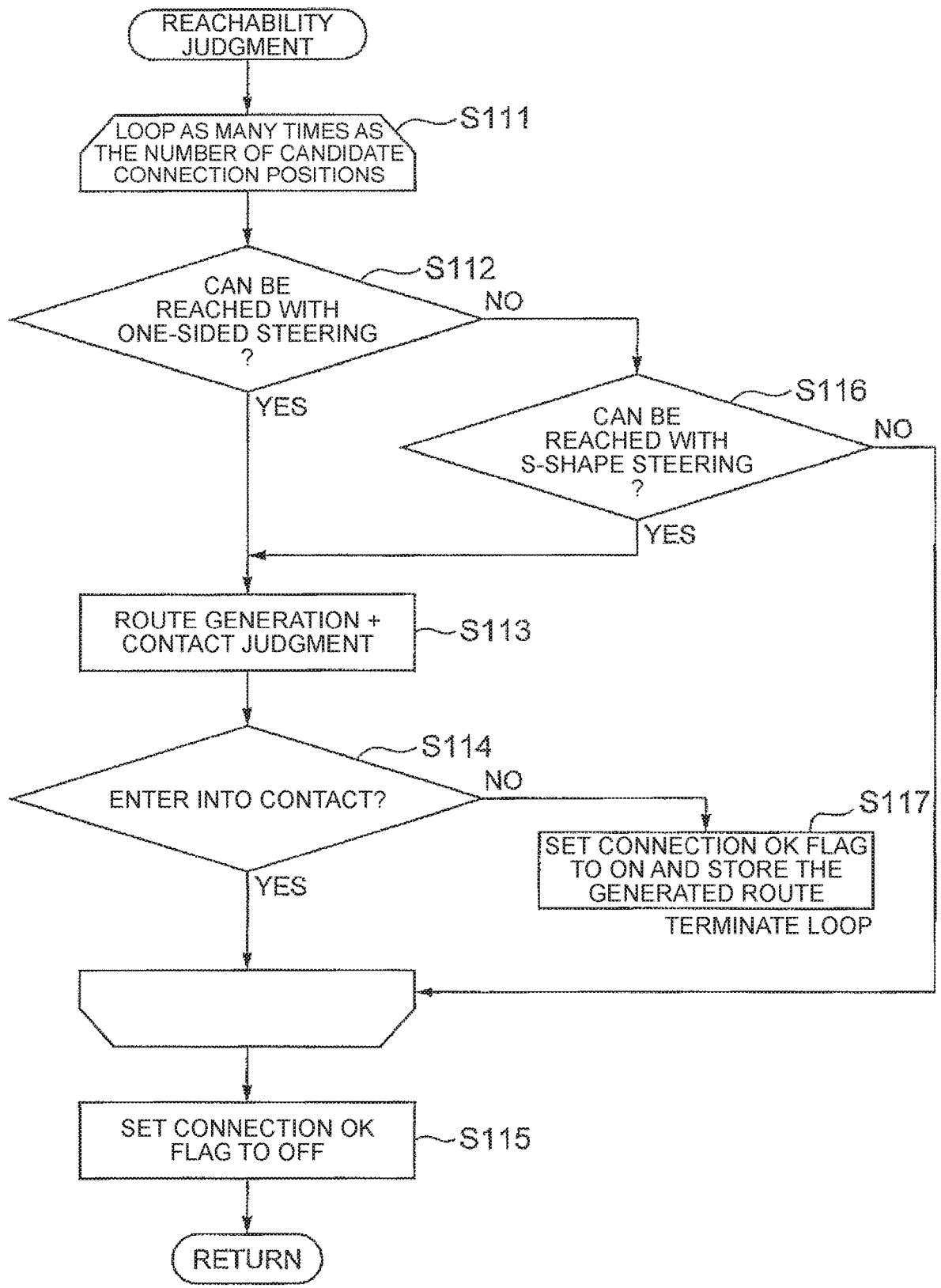
FIG. 7 is a processing flow of a connection route calculation unit.

FIG. 7 is a processing flow of the reachability judgment.

This processing flow is looped as many times as the number of the total sum of the candidate connection positions A and C (S111); and firstly, whether or not the closet candidate connection position A or C can be reached by one-sided steering from the initial position P0 is judged (S112). The one-sided steering is the operation to turn the steering wheel of the driver's own vehicle V to either one side, to the right or left, and the front wheels are turned only to either one side, to the right or left, relative to the vehicle direction Vf. Then, if it is judged that the candidate connection position A or C cannot be reached only by the one-sided steering, whether the candidate connection position A or C can be reached by S-shape steering or not is judged (S116). The S-shape steering is the operation to turn the steering wheel of the driver's own vehicle V to both sides, to the right and the left, and the front wheels are turned to both sides, to the right and the left, relative to the vehicle direction Vf.

Then, if it is judged that the candidate connection position A or C can be reached by the one-sided steering or the S-shape steering, that candidate connection position A or C is selected as the out-of-parking-space position E and a reachable route from the initial position P0 of the driver's own vehicle V to the out-of-parking-space position E is generated (S113).

Subsequently, whether or not the virtual frame of the driver's own vehicle V will contact the obstacle in the reachable route is judged (S114); and if it is judged that the virtual frame will not contact the obstacle, a connection OK flag is set to ON and the generated reachable route is stored in a storage means, and the loop is terminated (S117). On the other hand, if it is judged that the candidate connection position A or C cannot be reached by the one-sided steering and the S-shape steering (NO in S112 and S116), or if it is judged upon the contact judgment that the contact will be made, the judgment on the relevant candidate connection position A or C is terminated and the judgment will be performed on the remaining candidate connection positions A or C. Then, if it is judged that all the candidate connection positions A or C cannot be reached, the connection OK flag is set to OFF (S115) and the processing flow is terminated.

Figure 8A:
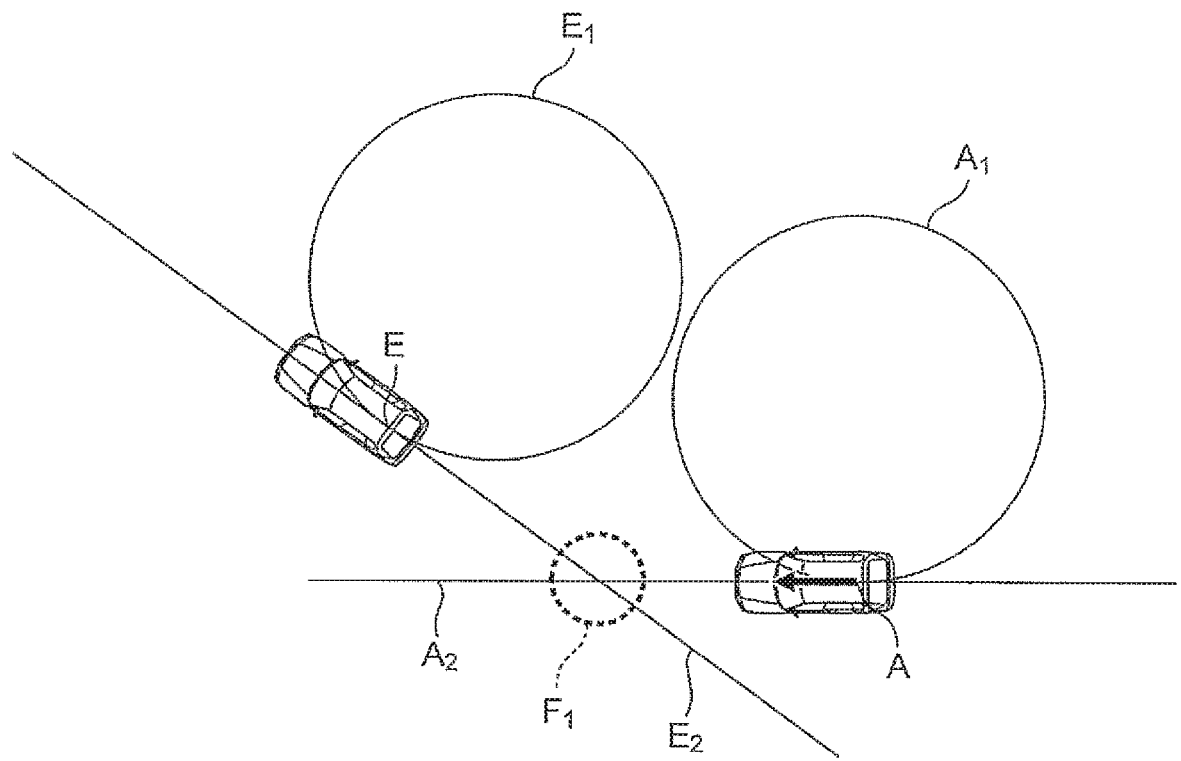
FIG. 8A is a diagram for explaining an example of a reachability judgment by one-sided steering.
Figure 8B:
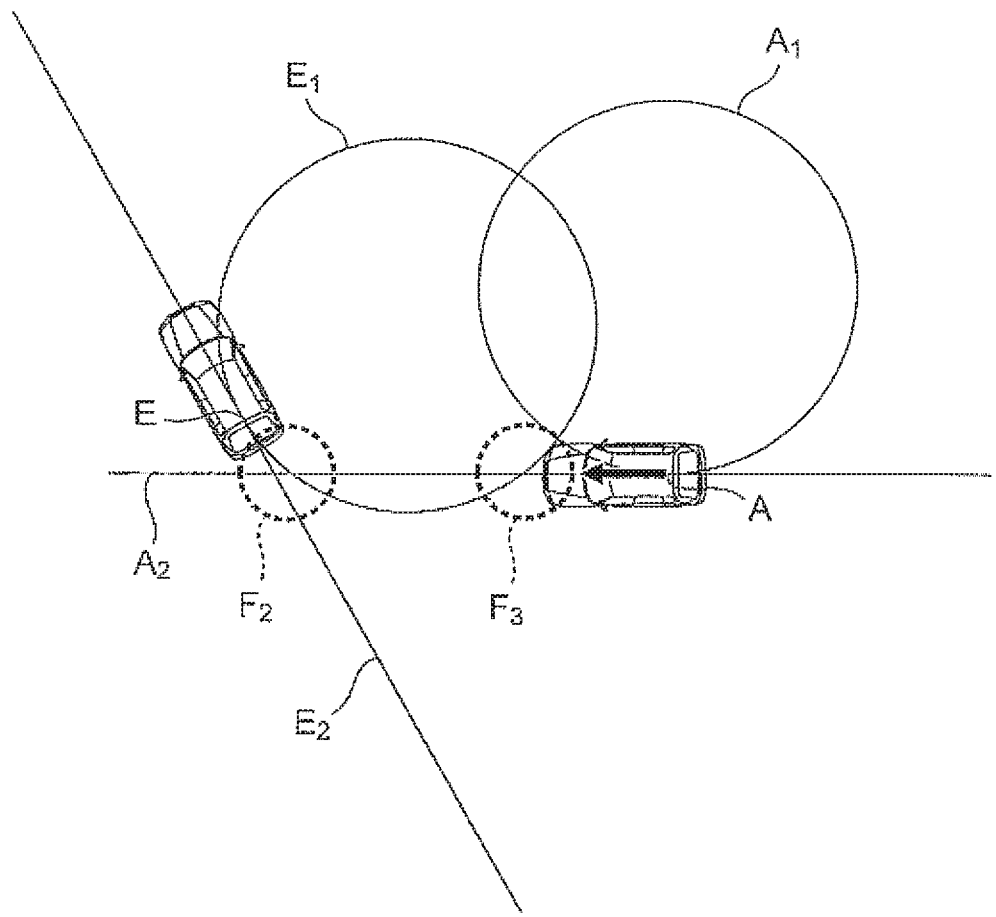
FIG. 8B is a diagram for explaining an example of the reachability judgment by the one-sided steering.
Figure 8C:
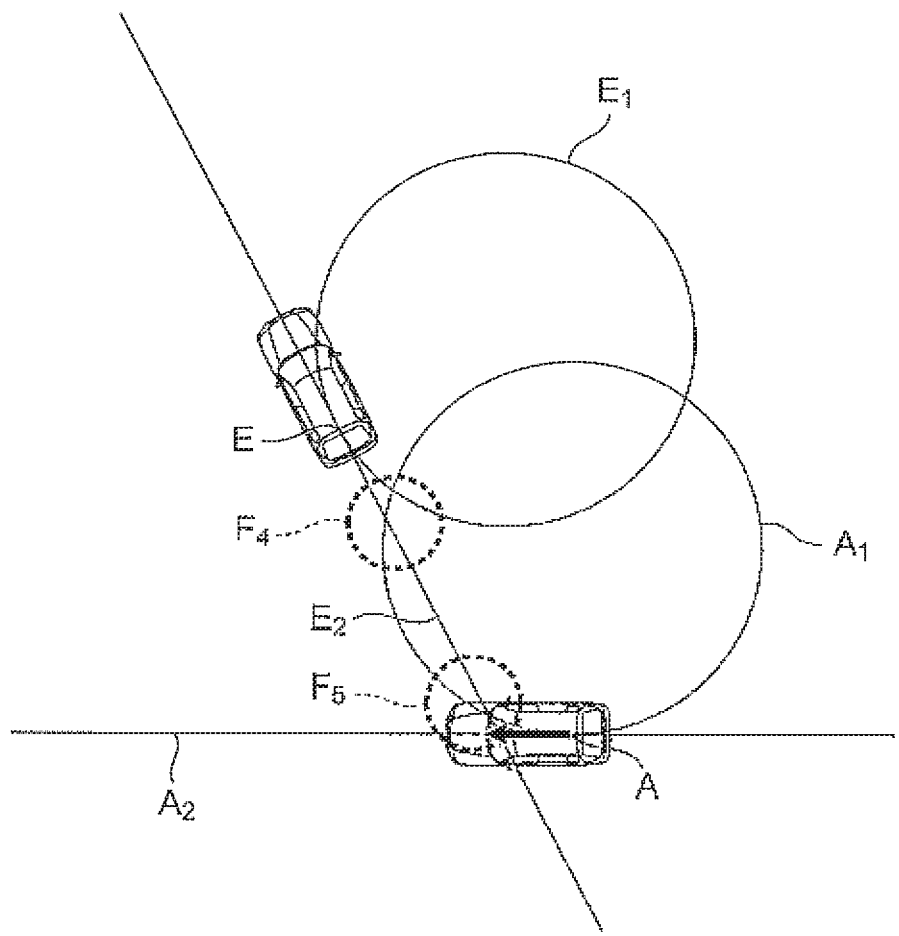
FIG. 8C is a diagram for explaining an example of the reachability judgment by the one-sided steering.
Figure 8D:
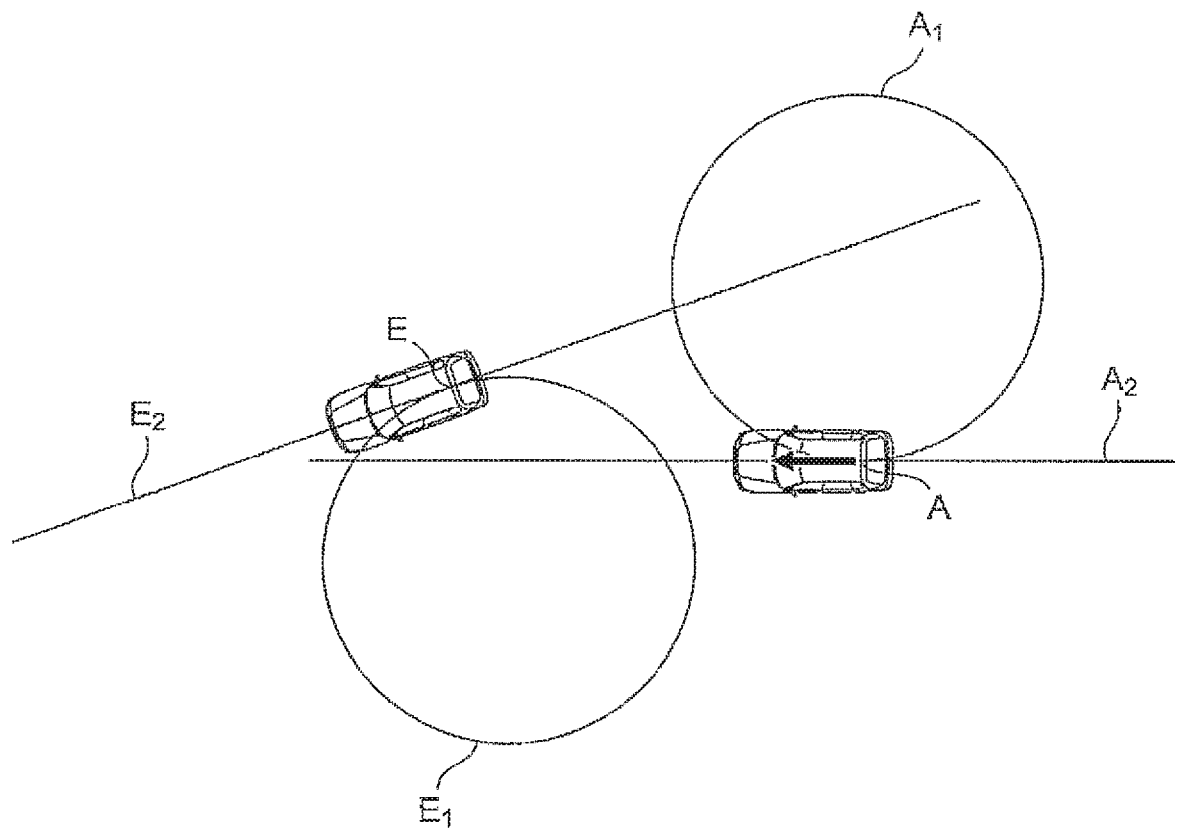
FIG. 8D is a diagram for explaining an example of a reachability judgment by S-shape steering.
Figure 8E:
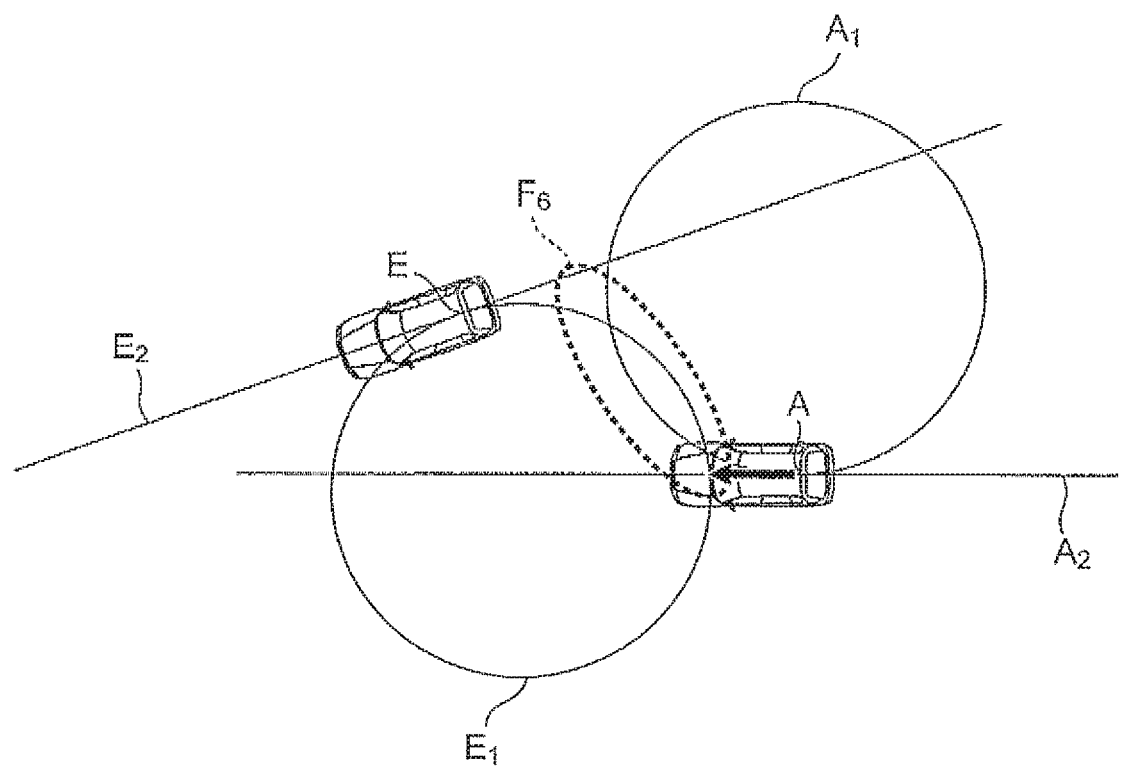
FIG. 8E is a diagram for explaining an example of the reachability judgment by the S-shape steering.

FIG. 8A to FIG. 8C are diagrams for explaining examples of the reachability judgment by the one-sided steering; and FIG. 8D and FIG. 8E are diagrams for explaining examples of the reachability judgment by the S-shape steering.

Regarding the reachability judgment by the one-sided steering in S112, it is judged that the relevant position can be reached when all the following conditions (a1) to (a3) are satisfied (both the angle difference and the positions are also used as limitations).

(a1) An axis line A2 (the vehicle direction Vf) at the current position A (the initial position P0) of the driver's own vehicle V intersects with an axis line E2 (the vehicle direction Vf) at the candidate connection position E.

(a2) A clearance circle A1 at the current position A does not intersect with the axis line E2 at the candidate connection position E.

(a3) A clearance circle E1 at the candidate connection position E does not intersect with the axis line A2 at the current position A.

Incidentally, the clearance circle means a circular arc (minimum rotation locus) on the turning side in consideration of clothoids.

In the example illustrated in FIG. 8A, the axis lines A2 and E2 intersect with each other at an intersection position F1, so that the above condition (a1) is satisfied. Then, the above conditions (a2) and (a3) are also satisfied. Therefore, it is judged that the relevant position can be reached by the one-sided steering. On the other hand, in FIG. 8B, the clearance circle E1 intersects with the axis line A2, so that the above condition (a3) is not satisfied. Then, in the example illustrated in FIG. 8C, the clearance circle A1 intersects with the axis line E2, so that the above (a2) is not satisfied. Therefore, in the examples illustrated in FIG. 8B and FIG. 8C, it is judged that the relevant position cannot be reached by the one-sided steering; and the processing proceeds to the judgment whether the S-shape steering can be used or not.

Regarding the reachability judgement by the S-shape steering in S116, it is judged that the relevant position can be reached when the following condition (a4) is satisfied (both the angle difference and the position are also used as limitations).

(a4) The clearance circle A1 at the current position A does not intersect with the clearance circle E1 at the candidate connection position E.

In the example illustrated in FIG. 8D, the clearance circle A1 does not intersect with the clearance circle E1, so that the above condition (a4) is satisfied. Therefore, it is judged that the relevant position can be reached by the S-shape steering. On the other hand, in the example illustrated in FIG. 8E, the clearance circle A1 intersects with the clearance circle E1, so that the above condition (a4) is not satisfied and it is judged that the relevant position cannot be reached by the S-shape steering.

Figure 9:
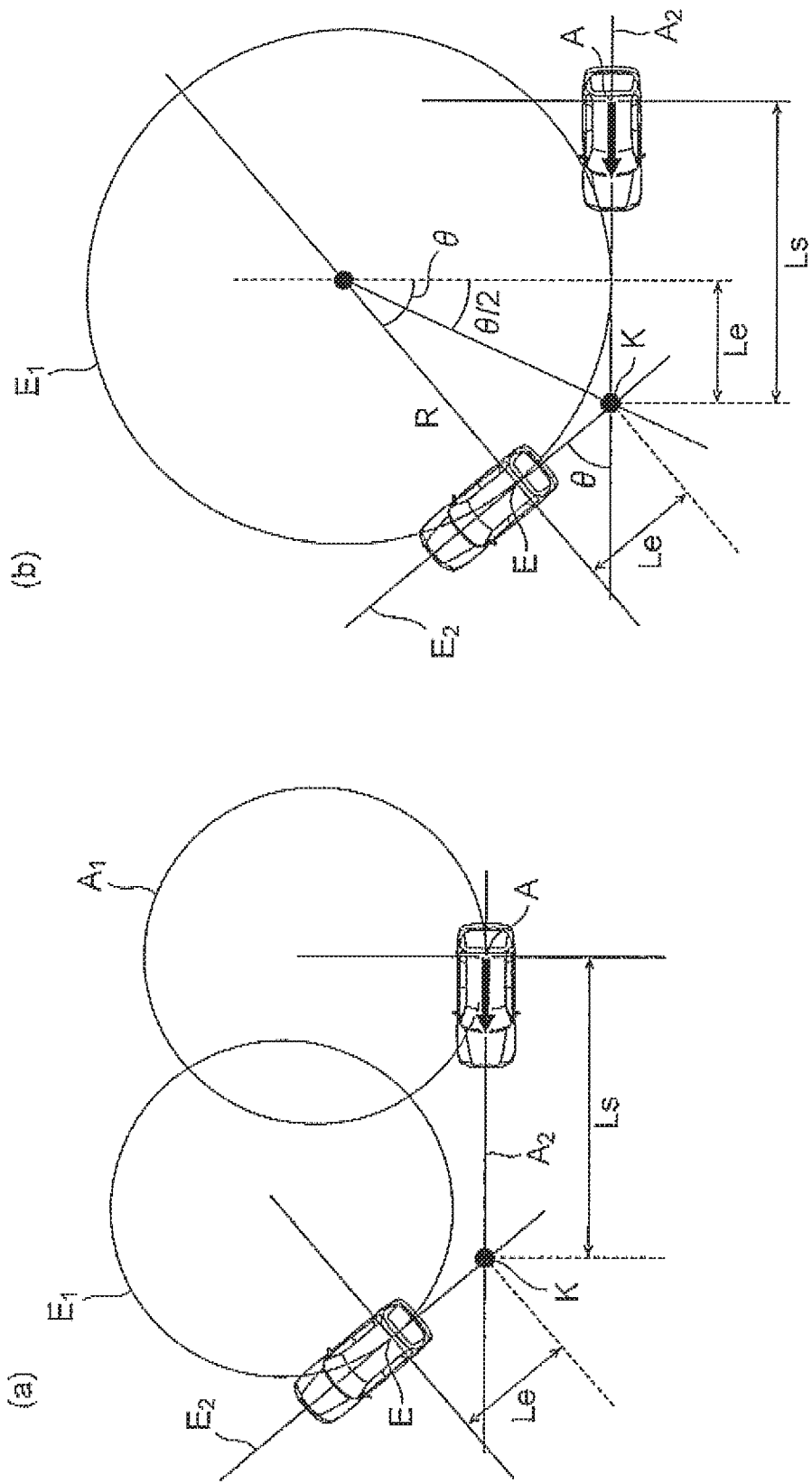
FIG. 9 is a diagram for explaining a method for generating a reachable route by the one-sided steering.

FIG. 9 is a diagram for explaining the method for generating the reachable route by the one-sided steering.

In order to generate a route from the current position A to the candidate connection position E by the one-sided steering, firstly as illustrated in FIG. 9(a), a distance Ls between an intersection point K between the axis line A2 and the axis line E2, and the current position A, and a distance Le between the intersection point K and the candidate connection position E are calculated, respectively, and a shorter distance is selected (the distance Le is selected in the example illustrated in the drawing). Then, as illustrated in FIG. 9(b), a circle which has the two axis lines A2, E2 as common tangential lines and passes through a position separated from the intersection point K by the shorter distance is drawn and its radius R is calculated according to the following formula (1).

[Math. 1]

$$R = \frac{L_e}{\tan\frac{\theta}{2}} \quad (1)$$

As a result, the reachable route can be generated by combining the straight line and the circular arc.

Figure 10:
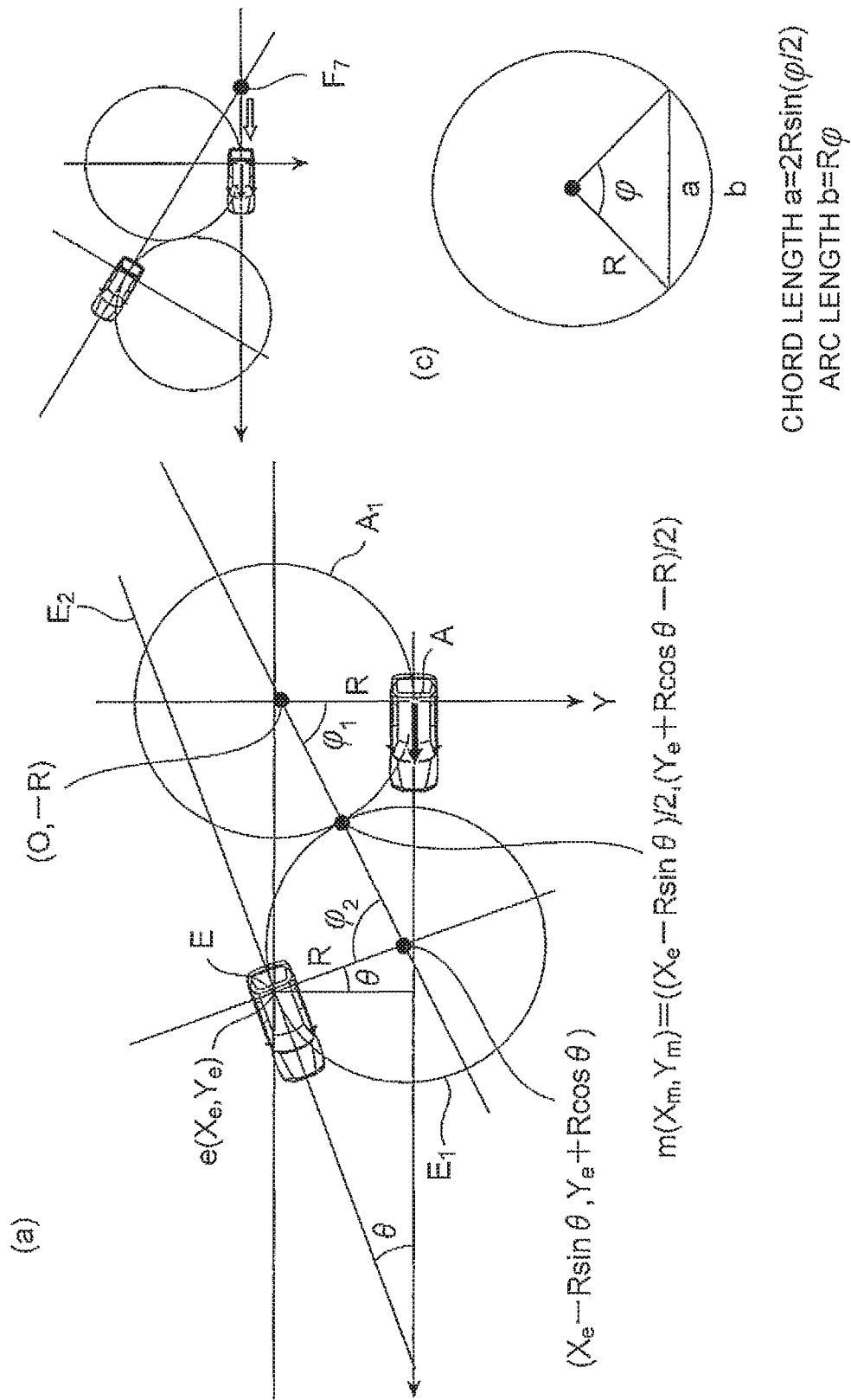
FIG. 10 is a diagram for explaining the method for generating a reachable route by the S-shape steering.

FIG. 10 is a diagram for explaining the method for generating the reachable route by the S-shape steering and is a diagram for explaining the generation method when the axis line E2 does not intersect with the X-axis, which is the axis line A2 of the current position A, behind the candidate connection position E.

In this example, the radius R of common circles whose radii are used for drawing the S-shape is calculated. If a contact point of the circles can be found, the S-shape reachable route can be generated by combining a circular arc of the clearance circle A1 and a circular arc of the clearance circle E1.

Since center coordinates of each circle can be found, the radius of the common circle can be found from the distance between the center coordinates.

[Math. 2]

$$2R = \sqrt{(X_e - R\sin\theta)^2 + (Y_e + R\cos\theta + R)^2} \quad (2)$$

[Math. 3]

$$R = \frac{X_e\sin\theta - Y_e(1 + \cos\theta) - \sqrt{\{X_e\sin\theta - Y_e(1 + \cos\theta)\}^2 - 2(\cos\theta - 1)(X_e^2 + Y_e^2)}}{2(\cos\theta - 1)} \quad (3)$$

However, in a case of e=0, the following formula is used.

[Math. 4]

$$R = -\frac{X_e^2 + Y_e^2}{4Y_e} \quad (4)$$

The position of the intersection point F7 indicated in FIG. 10(b) from the state illustrated in FIG. 10(a) can be calculated according to the above-mentioned calculation formulas.

Based on formulas indicated in FIG. 10(c), turning angles $\varphi_1$, $\varphi_2$ and arc lengths $b_1$, $b_2$ of the S-shape can be calculated respectively according to the following calculation formulas.

[Math. 5]

$$\varphi_1 = 2\sin^{-1}\left(\frac{\sqrt{X_m^2 + Y_m^2}}{2R}\right) \quad (5)$$

[Math. 6]

$$b_1 = 2R\sin^{-1}\left(\frac{\sqrt{X_m^2 + Y_m^2}}{2R}\right) \quad (6)$$

[Math. 7]

$$\varphi_2 = 2\sin^{-1}\left(\frac{\sqrt{(X_m - X_e)^2 + (Y_m - Y_e)^2}}{2R}\right) \quad (7)$$

[Math. 8]

$$b_2 = 2R\sin^{-1}\left(\frac{\sqrt{(X_m - X_e)^2 + (Y_m - Y_e)^2}}{2R}\right) \quad (8)$$

Figure 11:
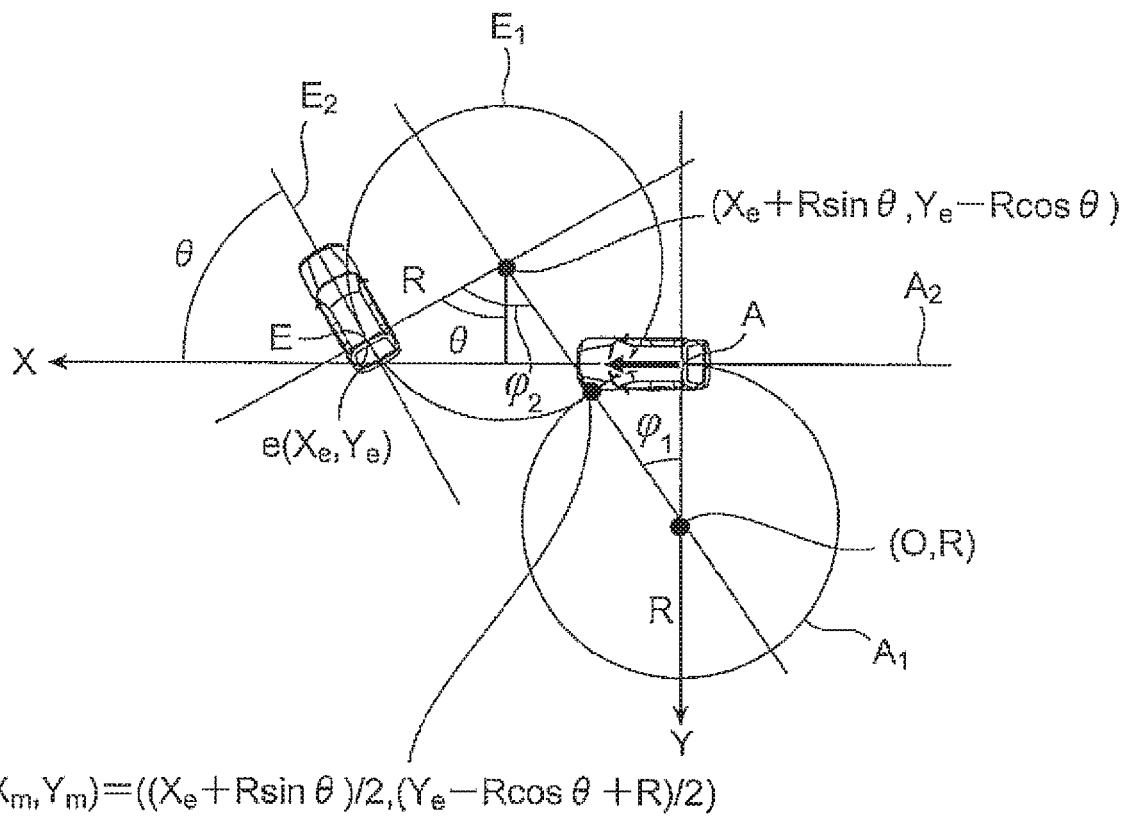
FIG. 11 is a diagram for explaining the method for generating the reachable route by the S-shape steering.

FIG. 11 is a diagram for explaining the method for generating the reachable route by the S-shape steering and is a diagram for explaining the generation method when the axis line E2 intersects with the X-axis, which is the axis line A2 of the current position A, behind the candidate connection position E.

In this example, the radius R of the common clearance circles E1, A1 whose radii for drawing the S-shape are the same is calculated. Then, if a contact point of the circles can be found, the S-shape reachable route can be generated by combining a circular arc of the clearance circle A1 and a circular arc of the clearance circle E1.

Since center coordinates of each circle can be found, the radius of the common circle can be found from the distance between the center coordinates.

[Math. 9]

$$2R = \sqrt{(X_e + R\sin\theta)^2 + (Y_e - R\cos\theta - R)^2} \quad (9)$$

[Math. 10]

$$R = \frac{-\{X_e\sin\theta - Y_e(1 + \cos\theta)\} - \sqrt{\{X_e\sin\theta - Y_e(1 + \cos\theta)\}^2 - 2(\cos\theta - 1)(X_e^2 + Y_e^2)}}{2(\cos\theta - 1)} \quad (10)$$

Based on formulas indicated in FIG. 11(c), turning angles $\varphi_1$, $\varphi_2$ and arc lengths $b_1$, $b_2$ of the S-shape can be calculated respectively according to the following calculation formulas.

[Math. 11]

$$\varphi_1 = 2\sin^{-1}\left(\frac{\sqrt{X_m^2 + Y_m^2}}{2R}\right) \quad (11)$$

[Math. 12]

$$b_1 = 2R\sin^{-1}\left(\frac{\sqrt{X_m^2 + Y_m^2}}{2R}\right) \quad (12)$$

[Math. 13]

$$\varphi_2 = 2\sin^{-1}\left(\frac{\sqrt{(X_m - X_e)^2 + (Y_m - Y_e)^2}}{2R}\right) \quad (13)$$

[Math. 14]

$$b_2 = 2R\sin^{-1}\left(\frac{\sqrt{(X_m - X_e)^2 + (Y_m - Y_e)^2}}{2R}\right) \quad (14)$$

Figure 12:
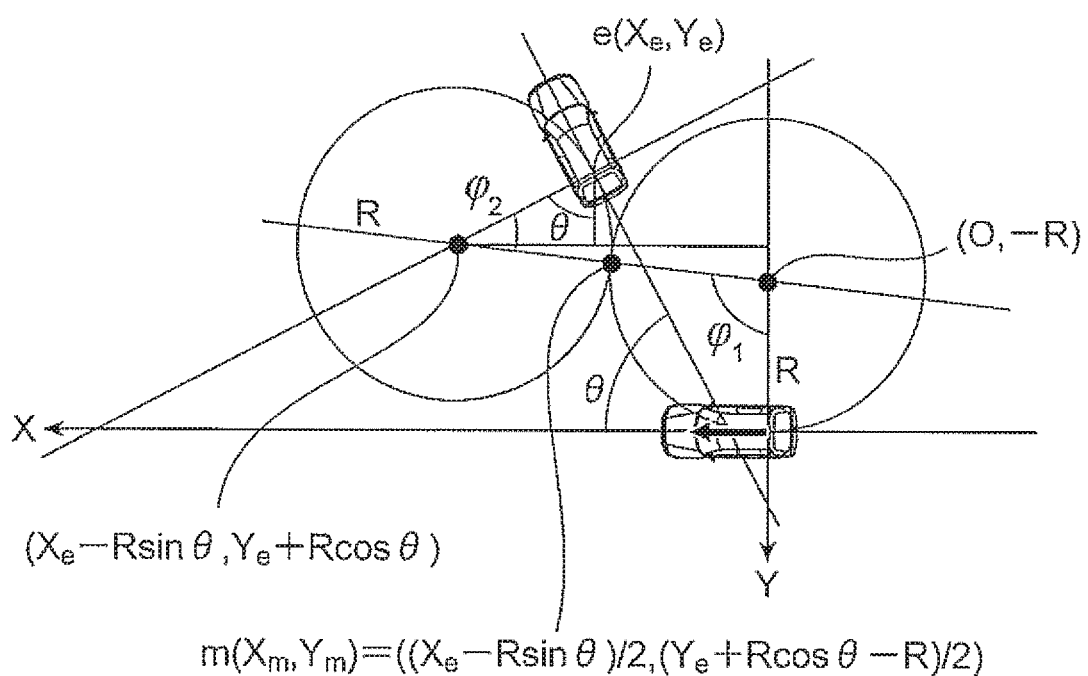
FIG. 12 is a diagram for explaining the method for generating the reachable route by the S-shape steering.

FIG. 12 is a diagram for explaining the method for generating the reachable route by the S-shape steering and is a diagram for explaining the generation method when the axis line E2 intersects with the X-axis, which is the axis line A2 of the current position A, behind the candidate connection position E.

In this example, the radius R of common circles E1, A1 whose radii for drawing the S-shape are the same is calculated.

Then, if a contact point of the circles can be found, the S-shape reachable route can be generated by combining a circular arc of the clearance circle A1 and a circular arc of the clearance circle E1.

Since center coordinates of each circle can be found, the radius of the common circle can be found from the distance between the center coordinates.

[Math. 15]

$$2R = \sqrt{(X_e - R\sin\theta)^2 + (Y_e + R\cos\theta + R)^2} \quad (15)$$

[Math. 16]

$$R = \frac{X_e\sin\theta - Y_e(1 + \cos\theta) - \sqrt{\{X_e\sin\theta - Y_e(1 + \cos\theta)\}^2 - 2(\cos\theta - 1)(X_e^2 + Y_e^2)}}{2(\cos\theta - 1)} \quad (16)$$

Based on formulas indicated in FIG. 10(c), turning angles $\varphi_1$, $\varphi_2$ and arc lengths $b_1$, $b_2$ of the S-shape can be calculated respectively according to the following calculation formulas.

[Math. 17]

$$\varphi_1 = 2\sin^{-1}\left(\frac{\sqrt{X_m^2 + Y_m^2}}{2R}\right) \quad (17)$$

[Math. 18]

$$b_1 = 2R\sin^{-1}\left(\frac{\sqrt{X_m^2 + Y_m^2}}{2R}\right) \quad (18)$$

[Math. 19]

$$\varphi_2 = 2\sin^{-1}\left(\frac{\sqrt{(X_m - X_e)^2 + (Y_m - Y_e)^2}}{2R}\right) \quad (19)$$

-continued

[Math. 20]
$$b_2 = 2R\sin^{-1}\left(\frac{\sqrt{(X_m - X_e)^2 + (Y_m - Y_e)^2}}{2R}\right) \quad (20)$$

<Steering Wheel Turning Position and Travel Distance Judgment>

The steering wheel turning position and travel distance judgment unit 13 judges whether the above-described parking route satisfies specified conditions or not.

Figure 13:
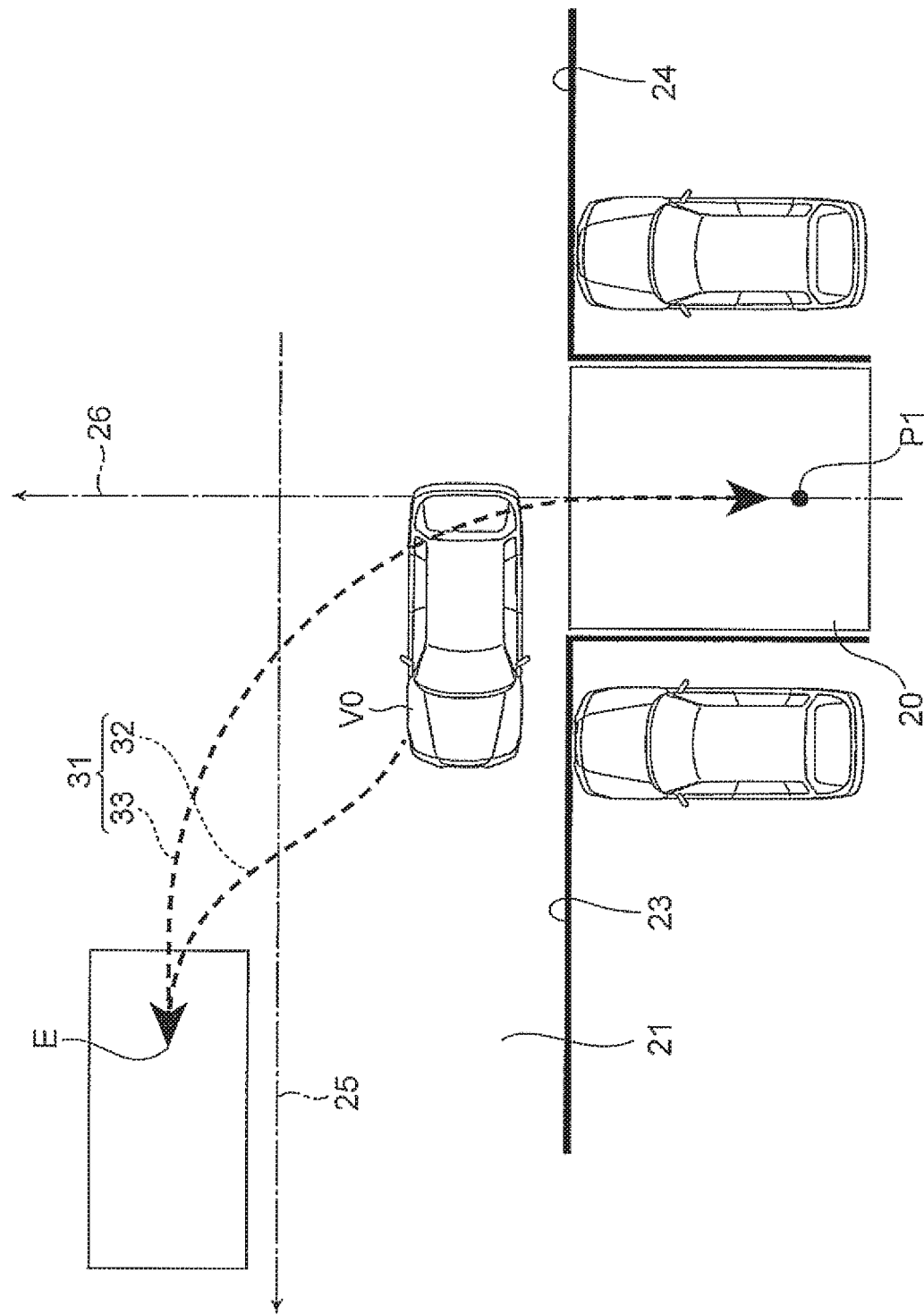
FIG. 13 is a diagram of an NG example of a shortest steering wheel turning position and travel distance judgment unit.

FIG. 13 illustrates an NG case of the above-mentioned judgment. Particularly, when the driver's own vehicle Vo exists in the vicinity of the target parking position, the NG case may often occur. This is because when calculating the aforementioned candidate connection position, the minimum number of times of turning of the steering wheel is set.

Regarding a parking route 31 illustrated in FIG. 13, a connection route 32 is the S-shape, the lateral distance from the out-of-parking-space position E to the target parking position P1 is far, and the distance of a parking-space leaving route 33 is long; and as a result, the travel distance of the parking route 31 becomes long and there is fear that the parking route 31 may not be suited for the driver's needs. Furthermore, if the out-of-parking-space position E is out of a detection range of an external recognition sensor of the driver's own vehicle V, and when the driver's own vehicle V actually moves towards the out-of-parking-space position E, there is fear that a new obstacle(s) may be detected and it may become impossible to move along that parking route.

The steering wheel turning position and travel distance judgment unit 13 judges: whether or not the candidate connection position (the out-of-parking-space position E), which was judged as being reachable through the connection route 32 from the initial position P0, is located within the recognition range of the external recognition sensor at the initial position P0 of the driver's own vehicle V (the recognition range judgment unit); and whether the travel distance of the parking route 31 is equal to or less than a threshold value or not.

If these two conditions are satisfied (OK case), that information is delivered to the traveling route setting unit 15; and if at least one of the two conditions is not satisfied (NG case), the calculation processing by the shortest steering wheel turning position calculation unit 14 is executed. However, if the connection route calculation unit 12 fails to calculate the connection route from the shortest steering wheel turning position G calculated by the shortest steering wheel turning position calculation unit 14, the parking route 31 is selected even if it is far.

<Shortest Steering Wheel Turning Position Calculation Unit>

In the case of NG by the steering wheel turning position and travel distance judgment unit 13, the shortest steering wheel turning position calculation unit 14 calculates a position reached by performing the forward movement with turning with a specified turning radius RS from the initial position P0, performing the forward movement until the reachable limit position F relative to the obstacle 22 on the passage side, and then performing the reverse movement with turning with the specified turning radius RS to move to the shortest steering wheel turning position G which is the reachable limit position relative to the obstacles 23, 24 on the right and left sides of the target parking position P1.

Figure 14:
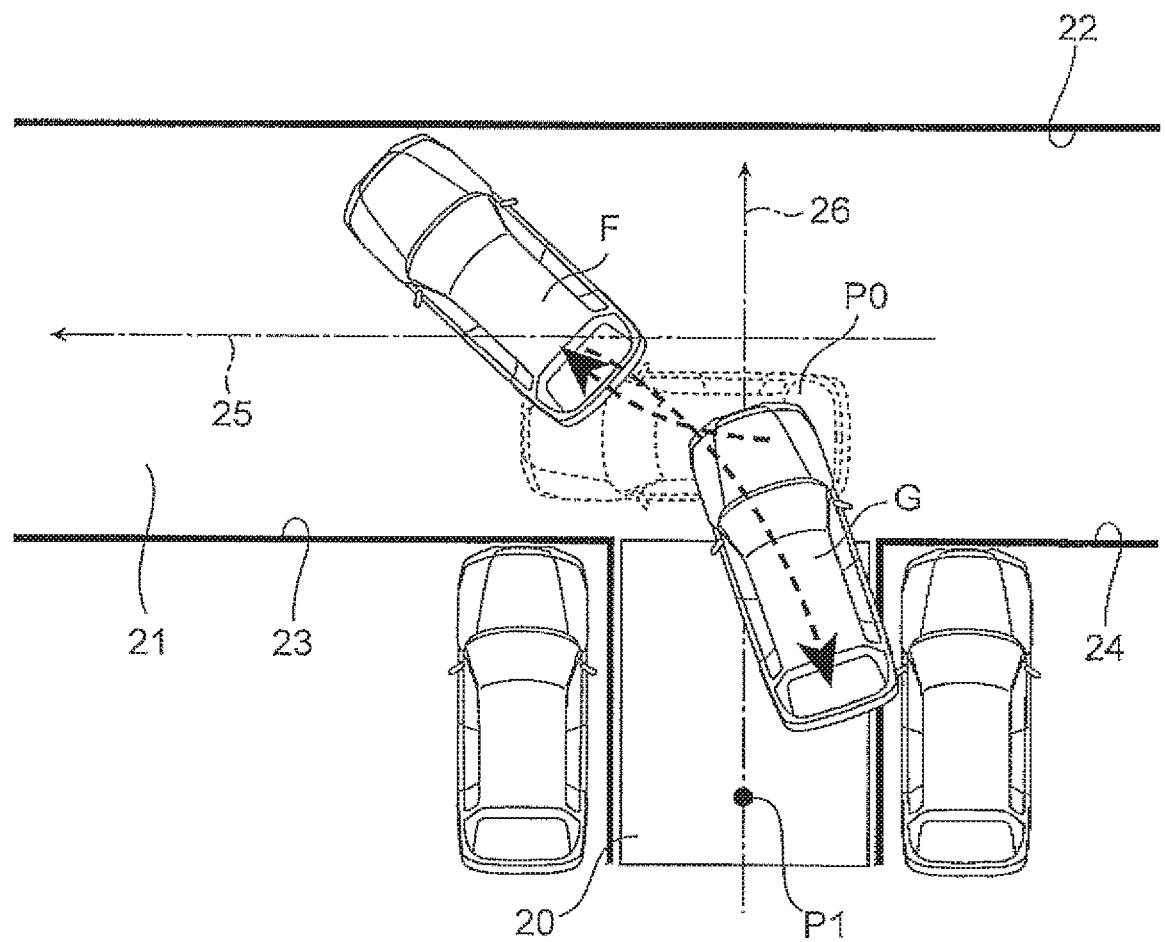
FIG. 14 is a diagram for calculating the shortest steering wheel turning position.

FIG. 14 is a diagram when calculating the shortest steering wheel turning position. As explained above, the reachable limit position F reached by the forward movement with the turning radius RS becomes close to the obstacle 22 on the passage side and the shortest steering wheel turning position G which is the reachable limit value reached by the reverse movement becomes close to the obstacles 22, 23 on the right and left sides.

Figure 15:
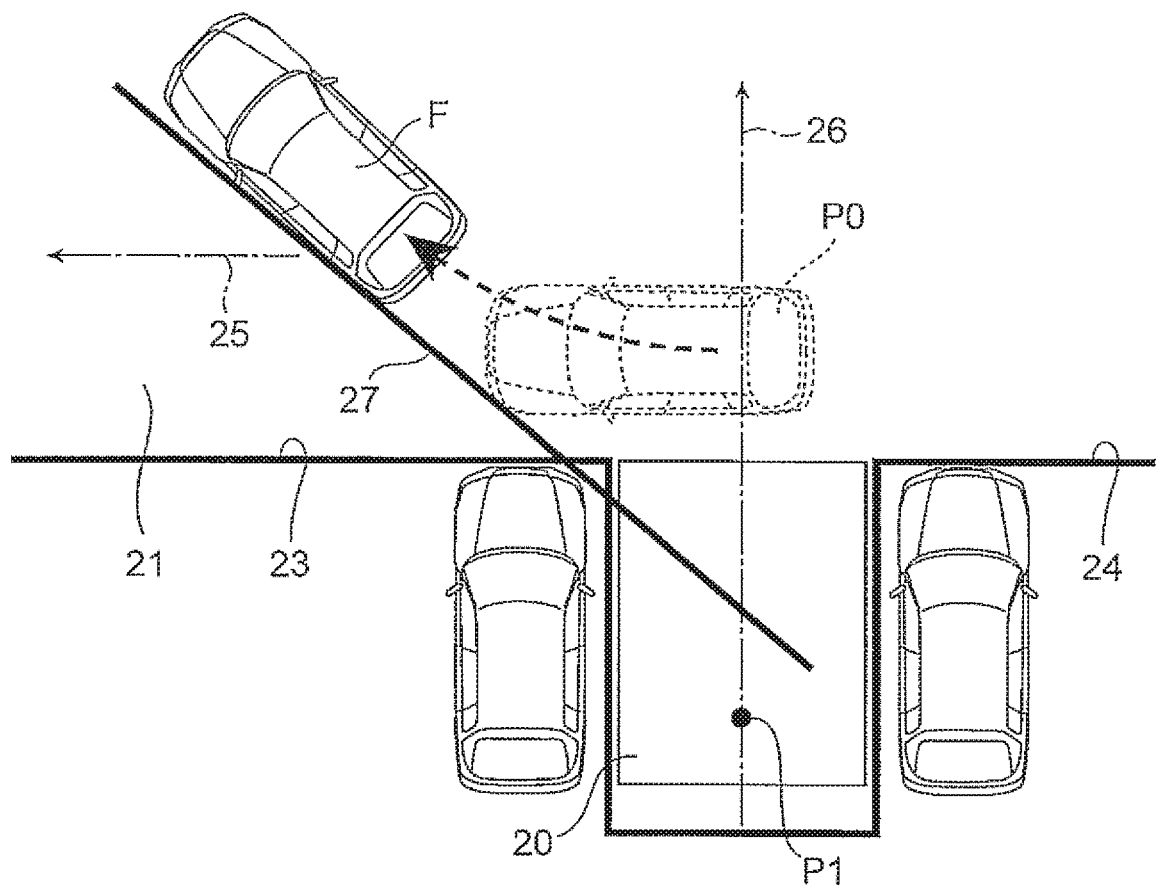
FIG. 15 is a diagram of a position where a forward movement is finished when calculating the shortest steering wheel turning position.

FIG. 15 illustrates a case where the forward movement calculation is terminated.

In the process of calculating the calculated reachable limit position F, if a situation comes where a straight line 27 which is extended backwards along the lateral side of outside wheels of the driver's own vehicle V intersects with the obstacle 23 closer to the outside wheels of the target parking position P1 before the driver's own vehicle V reaches the reachable limit position F, the shortest steering wheel turning position calculation unit 14 terminates the forward movement calculation.

If the forward movement with turning is further performed in the above-described case, it becomes impossible to make the driver's own vehicle V reach the target parking position P1 by the reverse movement with turning by one-sided steering. Therefore, the calculation of the forward movement is terminated and the calculation of the reverse movement with turning from that position is started.

The traveling route calculated by the shortest steering wheel turning position calculation unit 14 is designed based on the driver's behaviors and can be considered to be suited for their needs. The driver's behaviors can be summarized such that the driver often tends to perform the parking operation by preferentially turning the driver's own vehicle V in the same direction as that of the target parking position P1; and the operation of the shortest steering wheel turning position calculation unit is designed to operate in light of such behaviors.

If the NG judgment result is obtained by the steering wheel turning position and travel distance judgment unit 13, a connection route for connecting to the candidate connection position A or C, which was set by the candidate connection position setting unit 11, from the shortest steering wheel turning position G calculated by the shortest steering wheel turning position calculation unit 14 is calculated according to the method described with respect to the connection route calculation unit 12.

Figure 16:
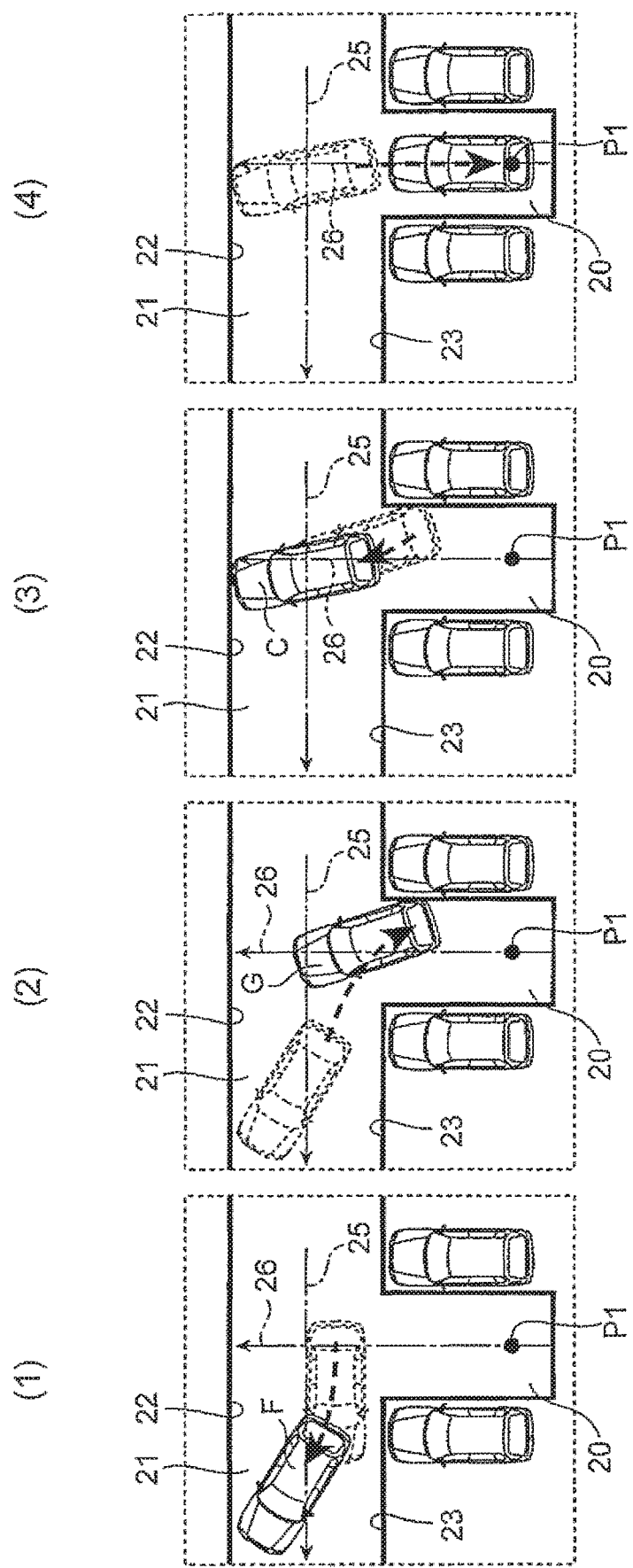
FIG. 16 is a diagram of a parking route when using the shortest steering wheel turning position.

FIG. 16 is a diagram illustrating a parking route when the connection route from the shortest steering wheel turning position G, which was calculated by the shortest steering wheel turning position calculation unit 14, to the candidate connection position C is calculated.

With the parking support apparatus 1 according to this embodiment, the target parking position P1 can be reached while controlling a reachable position(s) in a transverse direction, that is, while preventing an increase of the moving distance in the passage direction of the passage 21, by calculating the shortest steering wheel turning position G. This shows that the parking route suited for the needs is successfully calculated.

The embodiments of the present invention have been described above; however, the present invention is not limited to the aforementioned embodiments and various design changes can be made within the scope not departing from the gist of the present invention described in the claims. For example, the aforementioned embodiments have been described in detail in order to explain the invention in an easily comprehensible manner and are not necessarily limited to those having all the configurations explained above. Furthermore, part of the configuration of a certain embodiment can be replaced with the configuration of another embodiment and the configuration of another embodiment can be added to the configuration of a certain embodiment. Also, regarding part of the configuration of each embodiment, it is possible to add or delete the configuration of another configuration, or the part of the configuration of each embodiment can be replaced with the configuration of another configuration.

REFERENCE SIGNS LIST

1: parking support apparatus
11: candidate connection position calculation unit
12: connection route calculation unit
13: steering wheel turning position and travel distance judgment unit
14: shortest steering wheel turning position calculation unit
15: traveling route setting unit
16: display unit
20: parking space
21: passage
22, 23, 24: obstacles
25: passage direction
26: parking direction
V: driver's own vehicle
Vo: reference point (the position of the driver's own vehicle)
P0: initial position
P1: target parking position
A: candidate connection position
B: parking-space leaving route
C: newly-calculated candidate connection position
D: straight travel distance to be added
E: candidate connection position to be connected (out-of-parking-space position)
F: position immediately before the vehicle hits an obstacle on the passage side (reachable limit position)
G: position immediately before the vehicle hits obstacles on the right and left sides of target parking position (shortest steering wheel turning position)

The invention claimed is:

1. A parking support apparatus for supporting parking operation to perform backward parallel parking of a driver's own vehicle at a target parking position in a parking space provided along a lateral side of a passage, comprising:
a microcomputer including:
a reverse direction route calculation unit that calculates a reverse direction route for the driver's own vehicle to leave from the target parking position on the basis of the parking space and a behavior constraint condition for the driver's own vehicle;
a candidate connection position setting unit that sets a plurality of candidate connection positions along the reverse direction route;
a first parking route calculation unit that calculates a first connection route capable of reaching any one of the plurality of candidate connection positions from an initial position of the driver's own vehicle and calculates a first parking route by using the first connection route and the reverse direction route;
a recognition range judgment unit that judges whether or not a candidate connection position included in the first connection route is within a preset obstacle recognition range of an external obstacle recognition sensor mounted on the driver's own vehicle, at the initial position of the driver's own vehicle;
a travel distance judgment unit that judges whether or not a travel distance of the first parking route is equal to or less than a predetermined threshold value;
a shortest steering wheel turning position calculation unit that calculates a shortest steering wheel turning position which is obtained by turning a vehicle direction of the driver's own vehicle to a direction to make the vehicle direction of the driver's own vehicle closer to a direction to park in the parking space by moving the driver's own vehicle from the initial position with a forward/reverse steering change when it is judged by the recognition range judgment unit that the candidate connection position included in the first connection route is not within the preset obstacle recognition range;
a second parking route calculation unit that calculates a second connection route capable of reaching any one of the plurality of candidate connection positions from the shortest steering wheel turning position and calculates a second parking route by using the second connection route and the reverse direction route; and
a traveling route setting unit that
selects the second parking route as a parking route, when the second parking route calculation unit calculates the second parking route; and
selects the first parking route as the parking route, when the second parking route calculation unit cannot calculate the second parking route, and when the recognition range judgment unit judges that the candidate connection position included in the first connection route is within the preset obstacle recognition range and the travel distance judgment unit judges that the travel distance of the first parking route is equal to or less than the predetermined threshold value.

2. The parking support apparatus of claim 1, wherein the external obstacle recognition sensor is an ultrasonic sensor and an in-vehicle camera for recognizing obstacles in the parking route.

* * * * *